United States Patent
Chi Akah et al.

(10) Patent No.: US 12,018,215 B1
(45) Date of Patent: Jun. 25, 2024

(54) PROCESSES FOR DIRECT CONVERSION OF CRUDE OIL TO LIGHT OLEFINS AND LIGHT AROMATICS THROUGH STEAM ENHANCED CATALYTIC CRACKING OVER A CORE SHELL CRACKING CATALYST

(71) Applicants: Saudi Arabian Oil Company, Dhahran (SA); KING FAHD UNIVERSITY OF PETROLEUM AND MINERALS, Dhahran (SA)

(72) Inventors: Aaron Chi Akah, Dhahran (SA); Musaed Salem Al-Ghrami, Dammam (SA); Abdullah Mohammed Aitani, Dhahran (SA); Mohammed Abdul Bari Siddiqui, Dhahran (SA); Ziyauddin R. Qureshi, Dhahran (SA)

(73) Assignees: Saudi Arabian Oil Company, Dhahran (SA); King Fahd University of Petroleum and Minerals, Dhahran (SA)

( * ) Notice: Subject to any disclaimer, the term of this patent is extended or adjusted under 35 U.S.C. 154(b) by 0 days.

(21) Appl. No.: 18/299,123

(22) Filed: Apr. 12, 2023

(51) Int. Cl.
*C10G 47/16* (2006.01)
*B01J 21/04* (2006.01)
(Continued)

(52) U.S. Cl.
CPC .............. *C10G 47/16* (2013.01); *B01J 21/04* (2013.01); *B01J 29/40* (2013.01); *B01J 35/40* (2024.01);
(Continued)

(58) Field of Classification Search
CPC ............ C10G 47/16; C10G 2300/1033; C10G 2300/308; C10G 2300/4006;
(Continued)

(56) References Cited

U.S. PATENT DOCUMENTS 10,059,642 B1 * 8/2018 Al-Herz ................ C10G 11/05
2007/0227351 A1 * 10/2007 Garcia-Martinez ...... B01J 29/40
210/660
(Continued)

FOREIGN PATENT DOCUMENTS

CN          114425417 A      5/2022

OTHER PUBLICATIONS

Akah et al., "An Overview of Light Olefins Production via Steam Enhanced Catalytic Cracking", Catalysis Surveys from Asia, vol. 23, No. 4, 2019.
(Continued)

*Primary Examiner* — Ellen M McAvoy
*Assistant Examiner* — Chantel Graham
(74) *Attorney, Agent, or Firm* — DINSMORE & SHOHL LLP

(57) ABSTRACT

A process for converting a hydrocarbon feed may comprise contacting a hydrocarbon feed with steam in the presence of a cracking catalyst under steam enhanced catalytic cracking conditions. The contacting the hydrocarbon feed with the steam in the presence of the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may be a nanoparticle comprising: a core and a shell. The core may comprise one or more ZSM-5 zeolite particles and have an outer surface. The shell may comprise a plurality of fibers extending radially outward from the outer surface of the core. The plurality of fibers may comprise silica.

20 Claims, 9 Drawing Sheets

(51) Int. Cl.
  *B01J 29/40*   (2006.01)
  *B01J 35/40*   (2024.01)
  *B01J 35/51*   (2024.01)
  *B01J 37/02*   (2006.01)
  *B01J 37/08*   (2006.01)

(52) U.S. Cl.
  CPC .......... *B01J 35/51* (2024.01); *B01J 37/0221* (2013.01); *B01J 37/08* (2013.01); *B01J 2229/32* (2013.01); *C10G 2300/1033* (2013.01); *C10G 2300/308* (2013.01); *C10G 2300/4006* (2013.01); *C10G 2300/70* (2013.01); *C10G 2400/20* (2013.01)

(58) Field of Classification Search
  CPC .. C10G 2300/70; C10G 2400/20; B01J 21/04; B01J 29/40; B01J 35/023; B01J 35/08; B01J 37/0221; B01J 37/08; B01J 2229/32
  See application file for complete search history.

(56) References Cited

U.S. PATENT DOCUMENTS

| | | | |
|---|---|---|---|
| 2012/0122662 | A1 | 5/2012 | Khanmamedova et al. |
| 2020/0255753 | A1* | 8/2020 | Al-Herz ............... C10G 11/182 |
| 2022/0098493 | A1 | 3/2022 | Akah et al. |

OTHER PUBLICATIONS

Barghi et al., "Modeling of ZnZSM-5 deactivation during liquefied petroleum gas catalytic crackign in the presence of steam", Reac Kinet Mech Cat, DOI 10.1007/s11144-016-1126-2, Jan. 5, 2017, 22 pages.

Chenxi et al., "Effect of Ce-modified Fe/ZSM-5 zeolite for selective catalytic reduction of NOx by ammonia", E3S Web of Conferences, vol. 218, No. 03032, 2020.

Corma et al., "Steam catalytic cracking of naphtha over ZSM-5 zeolite for production of propene and ethene: Micro and macroscopic implications of the presence of steam", Applied Catalysis A: General, vol. 417-418, pp. 220-235, 2012.

Corma et al., "IM-5 zeolite for steam catalytic cracking of naphtha to produce propene and ethene. An alternative to ZSM-5 zeolite", Applied Catalysis A: General, vol. 460-461, pp. 106-115, 2013.

Dharia et al., "Catalytic Cracking for Integration of Refinery and Steam Crackers", Advances in Fluid Catalytic Cracking, Characterization & Environmntal Regulations, Occelli, M, Ed. CRC Press, New York, pp. 119-126, 2010.

Firmansyah et al., "Synthesis and characterization of fibrous silica ZSM-5 for cumene hydrocracking", Catalysis Science & Technology, vol. 6, pp. 5178-5182, 2016.

Fumoto et al., "Catalytic Cracking of Heavy Oil with Iron Oxide-based Catalysts Using Hydrogen and Oxygen Species from Steam", Journal of the Japan Petroleum Institute, vol. 58, No. 5, pp. 329-335, 2015.

Fumoto et al., "Iron Oxide Based Catalyst for Catalytic Cracking of Heavy Oil", Iron Ores and Iron Oxide Materials, Ed. V. Shatokha, IntechOpen, London, pp. 93-110, 2018.

Genquan et al., "Research and Commercial Application of CPP Technology for Producing Light Olefins from Heavy Oil", China Petroleum Processing and Petrochemical Technology, vol. 15, No. 3, pp. 7-12, Sep. 30, 2013.

Ghashghaee et al., "Steam catalytic cracking of fuel oil over a novel composite nanocatalyst: Characterizatoin, kinetics and comparative perspecive", Journal of Analytical and Applied Pyrolysis, vol. 138, pp. 281-293, 2019.

Gugel, "Executive Viewpoint: Introducing the refinery of the future":, Hydrocarbon Processing, March, issue No. 3, pp. 12-17, 2019.

Hambali et al., "Unique structure of fibrous ZSM-5 catalyst expedited prolonged hydrogen atom restoration for selective production of propylene from methanol", International Journal of Hydrogen Energy, vol. 46, pp. 24652-24665, 2021.

Lee, "The Growth Area That Refiners Will Need", Petrochemicals, Presented at the Asian Petrochemical Industry Conference (APIC), Taipei, May 2019.

Meng et al., "Studies on catalytic pyrolysis of heavy oils: Reaction behaviors and mechanistic pathways", Applied Catalysis A: General, vol. 294, pp. 168-176, 2005.

Mohiuddin et al., "Catalytic cracking of naphtha: The effect of Fe and Cr impregnated ZSM-5 on olefin selectivity", Applied Petrochemical Research, vol. 8, pp. 119-129, 2018.

Mukherjee, "KBR Olefins Technology—Technology options to meet uncertain market conditions", Presented at the 4th Petrochemicals Conclave, Delhi, Feb. 12, 2015.

Tallman, "Consider new catalytic routes for olefins production", Eng, Hydrocarbon Proc. 87 (4) pp. 95-101, 2008.

Yao, et al., "Preparation of Ce—Mn/Fe2O3 Catalysts for Steam Catalytic Cracking of Coal Tar", Energy Technology & Environmental Science, Chemistry Select, vol. 3, pp. 12537-12543, 2018.

Qureshi et al., "Steam catalytic cracking of crude oil over novel hierarchical zeolite-containing mesoporous silica-alumina core-shell catalysts", https://ssrn.com/abstract=4129096, Jun. 6, 2022.

* cited by examiner

PROCESSES FOR DIRECT CONVERSION OF CRUDE OIL TO LIGHT OLEFINS AND LIGHT AROMATICS THROUGH STEAM ENHANCED CATALYTIC CRACKING OVER A CORE SHELL CRACKING CATALYST

BACKGROUND

Field

The present disclosure relates to processes and catalysts for processing hydrocarbon materials and, in particular, processes and cracking catalysts for direct conversion of crude oil through steam enhanced catalytic cracking to produce olefins, aromatic compounds, or both.

Technical Background

The worldwide increasing demand for greater value petrochemical products and chemical intermediates remains a major challenge for many integrated refineries. In particular, the production of some valuable light olefins, such as ethylene and propylene, has attracted increased attention as pure olefin streams are considered the building blocks for polymer synthesis. Additionally, light aromatic compounds, such as benzene, toluene, and mixed xylenes can be useful as fuel blending constituents or can be converted to greater value chemical products and intermediates, which can be used as building blocks in chemical synthesis processes. Petrochemical feeds, such as crude oils, can be converted to petrochemicals, such as fuel blending components and chemical products and intermediates, such as light olefins and aromatic compounds, which are basic intermediates for a large portion of the petrochemical industry. Crude oil is conventionally processed by distillation followed by various reforming, solvent treatments, and hydro-conversion processes to produce a desired slate of fuels, lubricating oil products, chemicals, chemical feedstocks, and the like. Conventional refinery systems generally combine multiple complex refinery units with petrochemical plants to produce greater value petrochemical products and intermediates.

SUMMARY

Accordingly, there is an ongoing need for cracking catalysts and processes for steam enhanced catalytic cracking of crude oil feeds and other hydrocarbon feeds to produce greater yields of light olefins, light aromatic compounds, or both. The present disclosure is directed to a process for steam enhanced catalytic cracking a hydrocarbon feed using a cracking catalyst, where the cracking catalyst is a core shell particle comprising a ZSM-5 zeolite core and a shell comprising a plurality of fibers comprising silica. Without intending to be bound by any particular theory, it is believed that the bimodal pore structure of the present cracking catalysts improves transport of larger reactants and reaction products to and from the ZSM-5 active sites in the core. The present disclosure is further directed to a making the cracking catalyst using a zeolite-seed-assisted micro-emulsion method. The processes and methods of the present disclosure can more efficiently convert crude oil and other hydrocarbon feeds to greater value petrochemical products and intermediates compared to other conventional refinery processes.

According to at least one aspect of the present disclosure, a process for converting a hydrocarbon feed may comprise contacting a hydrocarbon feed with steam in the presence of a cracking catalyst under steam enhanced catalytic cracking conditions. The contacting the hydrocarbon feed with the steam in the presence of the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may be a nanoparticle comprising: a core and a shell. The core may comprise one or more ZSM-5 zeolite particles and have an outer surface. The shell may comprise a plurality of fibers extending radially outward from the outer surface of the core. The plurality of fibers may comprise silica.

Additional features and advantages of the aspects of the present disclosure will be set forth in the detailed description that follows and, in part, will be readily apparent to a person of ordinary skill in the art from the detailed description or recognized by practicing the aspects of the present disclosure.

BRIEF DESCRIPTION OF THE DRAWINGS

The following detailed description of the present disclosure may be better understood when read in conjunction with the following drawings in which.

Figure 1:
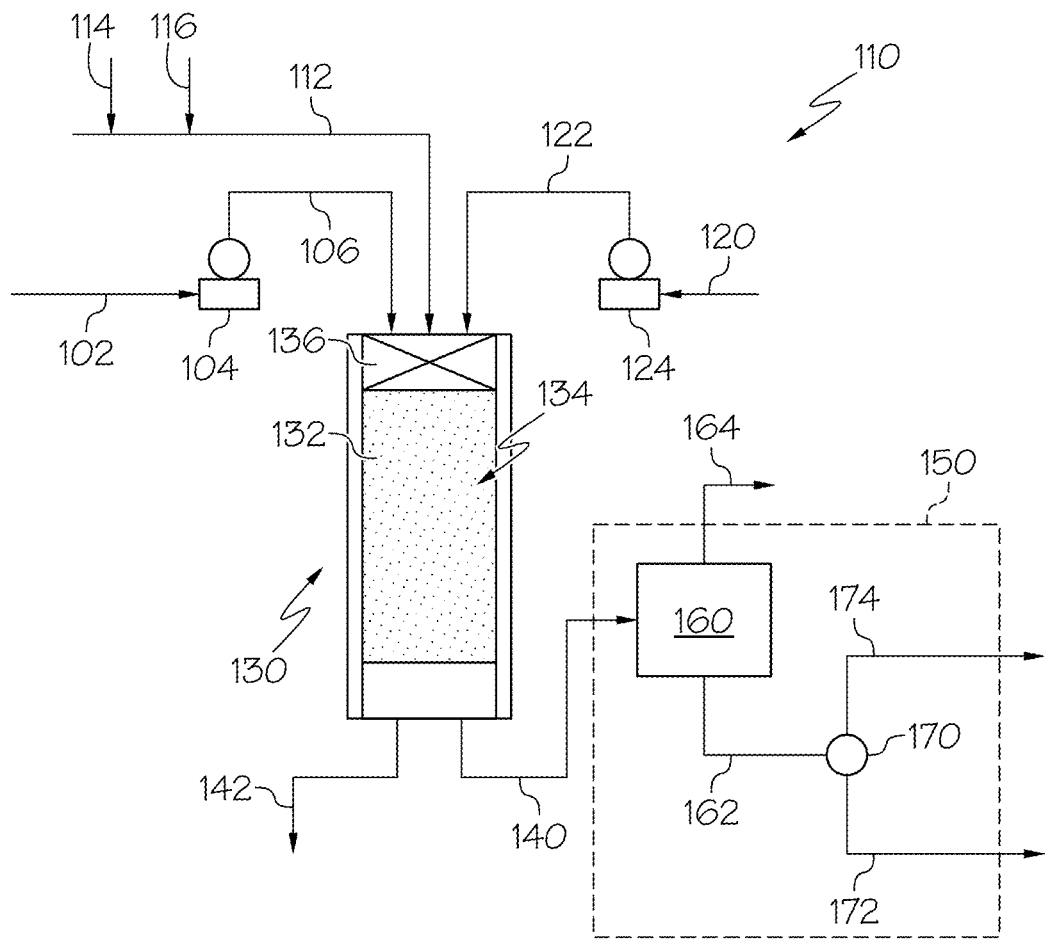
FIG. 1 schematically depicts a generalized flow diagram of a fixed bed reactor system for steam catalytic cracking of crude oil to produce olefins and aromatics, according to one or more embodiments shown and described in the present disclosure.

When describing the simplified schematic illustrations of the figures, the numerous valves, temperature sensors, electronic controllers, and the like, which may be used and are well known to a person of ordinary skill in the art, may not be included. Further, accompanying components that are often included in systems such as those depicted in the figures, such as air supplies, heat exchangers, surge tanks, and the like also may not be included. However, a person of ordinary skill in the art understands that these components are within the scope of the present disclosure.

Additionally, the arrows in the simplified schematic illustrations of the figures refer to process streams. However, the arrows may equivalently refer to transfer lines, which may transfer process steams between two or more system components. Arrows that connect to one or more system components signify inlets or outlets in the given system components and arrows that connect to only one system component signify a system outlet stream that exits the depicted system or a system inlet stream that enters the depicted system. The arrow direction generally corresponds with the major direction of movement of the process stream or the process stream contained within the physical transfer line signified by the arrow.

The arrows in the simplified schematic illustrations of the figures may also refer to process steps of transporting a process stream from one system component to another system component. For example, an arrow from a first system component pointing to a second system component may signify "passing" a process stream from the first system component to the second system component, which may comprise the process stream "exiting" or being "removed" from the first system component and "introducing" the process stream to the second system component.

Reference will now be made in greater detail to various aspects, some of which are illustrated in the accompanying drawings.

DESCRIPTION

The present disclosure is directed to cracking catalysts and processes for steam enhanced catalytic cracking of hydrocarbon feeds, such as crude oil, to produce greater yields of light olefins, light aromatic compounds, or both. A process of the present disclosure for converting a hydrocarbon feed may comprise contacting a hydrocarbon feed with steam in the presence of a cracking catalyst under steam enhanced catalytic cracking conditions. The contacting the hydrocarbon feed with the steam and the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The fibrous shell of the cracking catalysts of the present disclosure can improve access to reactive sites on the ZSM-5 zeolites and reduce blockage by large molecules from the crude oil.

As used in the present disclosure, the term "atmospheric boiling point temperature" refers to the boiling point temperature of a compound at atmospheric pressure.

As used in the present disclosure, the terms "butenes" or "mixed butenes" are used interchangeably and refer to combinations of one or a plurality of isobutene, 1-butene, trans-2-butene, or cis-2-butene. As used throughout the present disclosure, the term "normal butenes" refers to a combination of one or a plurality of 1-butene, trans-2-butene, or cis-2-butene. As used throughout the present disclosure, the term "2-butenes" refers to trans-2-butene, cis-2-butene, or a combinations of these.

As used in the present disclosure, the term "catalyst" refers to any substance that increases the rate of a specific chemical reaction, such as but not limited to cracking reactions.

As used in the present disclosure, the term "cracking" refers to a chemical reaction where a molecule having carbon-carbon bonds is broken into more than one molecule by the breaking of one or more of the carbon-carbon bonds or a cyclic moeity having carbon-carbon bonds is converted to a non-cyclic moeity by the breaking or one or more of the carbon-carbon bonds. As used in the present disclosure, the term "catalytic cracking" refers to cracking conducted in the presence of a catalyst. Some catalysts may have multiple forms of catalytic activity, and calling a catalyst by one particular function does not render that catalyst incapable of being catalytically active for other functionality.

As used in the present disclosure, the term "crude oil" or "whole crude oil" is to be understood to mean a mixture of petroleum liquids, gases, or combinations of liquids and gases, including, in embodiments, impurities such as but not limited to sulfur-containing compounds, nitrogen-containing compounds, and metal compounds, that have not undergone significant separation or reaction processes. Crude oils are distinguished from fractions of crude oil. In certain embodiments, the crude oil feedstock may be a minimally treated light crude oil to provide a crude oil feedstock having total metals (Ni+V) content of less than 5 parts per million by weight (ppmw) and Conradson carbon residue of less than 5 wt. %.

As used in the present disclosure, passing a stream or effluent from one unit "directly" to another unit refers to passing the stream or effluent from the first unit to the second unit without passing the stream or effluent through an intervening reaction system or separation system that substantially changes the composition of the stream or effluent. Heat transfer devices, such as heat exchangers, preheaters, coolers, condensers, or other heat transfer equipment, and pressure devices, such as pumps, pressure regulators, compressors, or other pressure devices, are not considered to be intervening systems that change the composition of a stream or effluent. Combining two streams or effluents together also is not considered to comprise an intervening system that changes the composition of one or both of the streams or effluents being combined.

As used in the present disclosure, the terms "downstream" and "upstream" refer to the positioning of components or unit operations of the processing system relative to a direction of flow of materials through the processing system. For example, a second component is considered "downstream" of a first component if materials flowing through the processing system encounter the first component before encountering the second component. Likewise, the first component is considered "upstream" of the second component if the materials flowing through the processing system encounter the first component before encountering the second component.

As used in the present disclosure, the term "effluent" refers to a stream that is passed out of a reactor, a reaction zone, or a separator following a particular reaction or separation. Generally, an effluent has a different composition than the stream that entered the reactor, reaction zone, or separator. It should be understood that when an effluent is passed to another component or system, only a portion of that effluent may be passed. For example, a slipstream or bleed stream may carry some of the effluent away, meaning that only a portion of the effluent may enter the downstream component or system. The terms "reaction effluent" and "reactor effluent" particularly refer to a stream that is passed out of a reactor or reaction zone.

As used in the present disclosure, the term "initial boiling point" or "IBP" of a composition refers to the temperature at which the constituents of the composition with the least boiling point temperatures begin to transition from the liquid phase to the vapor phase. As used in this disclosure, the term "end boiling point" or "EBP" of a composition refers to the temperature at which the greatest boiling temperature constituents of the composition transition from the liquid phase to the vapor phase. A hydrocarbon mixture may be characterized by a distillation profile expressed as boiling point temperatures at which a specific weight percentage of the composition has transitioned from the liquid phase to the vapor phase.

As used in the present disclosure, the term "light olefins" refers olefins having from 2 to 4 carbon atoms, such as but not limited to ethylene, propylene, and butenes.

As used in the present disclosure, the term "reactor" refers to any vessel, container, conduit, or the like, in which one or more chemical reactions, such as but not limited catalytic cracking reactions, may occur between one or more reactants optionally in the presence of one or more catalysts. One or more "reaction zones" may be disposed within a reactor. The term "reaction zone" refers to a volume where a particular chemical reaction takes place in a reactor.

As used in the present disclosure, the term "regenerated catalyst" refers to catalyst that has been contacted with reactants at reaction conditions and then regenerated in a regenerator regenerated through an in-place regeneration process to heat the catalyst to a greater temperature, oxidize and remove at least a portion of the coke or other organic contaminants from the catalyst to restore at least a portion of the catalytic activity of the catalyst, or both. The "regenerated catalyst" may have less coke or organic contaminants, a greater temperature, or both, compared to used catalyst and may have greater catalytic activity compared to used catalyst. The "regenerated catalyst" may have more coke and lesser catalytic activity compared to fresh catalyst that has not been contacted with reactants a cracking reaction zone and then regenerated.

The term "residence time" refers to the amount of time that reactants are in contact with a catalyst, at reaction conditions, such as at the reaction temperature.

As used in the present disclosure, the terms "separation unit" and "separator" refer to any separation device or plurality of separation devices that at least partially separates one or more chemical constituents in a mixture from one another. For example, a separation system selectively separates different chemical constituents from one another, forming one or more chemical fractions. Examples of separation systems include, without limitation, distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation processes described in the present disclosure may not completely separate all of one chemical constituent from all of another chemical constituent. Instead, the separation processes described in the present disclosure "at least partially" separate different chemical constituents from one another and, even if not explicitly stated, separation can include only partial separation.

As used in the present disclosure, the term "used catalyst" refers to catalyst that has been contacted with reactants at reaction conditions, but has not been regenerated in a regenerator. The "used catalyst" may have coke deposited on the catalyst and may include partially coked catalyst as well as fully coked catalysts. The amount of coke deposited on the "used catalyst" may be greater than the amount of coke remaining on the regenerated catalyst following regeneration. The "used catalyst" may also include catalyst that has a reduced temperature due to contact with the reactants compared to the catalyst prior to contact with the reactants.

As used in the present disclosure, the term "WABT" means weighted average bed temperature. WABT may be calculated according to the following Equation 1 (EQU. 1).

$$WABT = \sum_{i=1}^{N}(WABT_i \times Wc_i) \qquad \text{EQU. 1}$$

In EQU. 1, WABT, is the WABT for a particular section of catalyst bed, N is the number of catalyst beds, and $Wc_i$ is the weight fraction of the $i^{th}$ section of the catalyst bed based on the total weight of the catalyst bed.

It should further be understood that streams may be named for the components of the stream, and the component for which the stream is named may be the major constituent of the stream (such as the constituent comprising the greatest fraction of the stream, excluding inert diluent gases, such as nitrogen, noble gases, and the like, unless otherwise stated). It should also be understood that components of a stream are disclosed as passing from one system component to another when a stream comprising that component is disclosed as passing from that system component to another. For example, a disclosed "hydrocarbon stream" passing to a first system component or from a first system component to a second system component should be understood to equivalently disclose "hydrocarbons" passing to the first system component or passing from a first system component to a second system component.

Conventional refinery systems include multiple unit operations. Steam enhanced catalytic cracking of crude oil directly can reduce the complexity of the refining process, such as by reducing the number of unit operations needed to process the crude oil. Steam enhanced catalytic cracking typically uses ZSM-5 zeolites, which typically have a microporous pore structure having average pore size of less than 2 nanometers (nm). However, when cracking crude oil directly, crude oil can include a substantial amount of large molecules, such as up to 30 wt. % hydrocarbons having boiling point temperatures greater than or equal to 500° C. These large hydrocarbon molecules are not generally accessible to reactive sites in a conventional microporous ZSM-5 zeolite. Large molecules in crude oil can also plug the pores in the conventional ZSM-5, which can reduce the effectiveness of the conventional ZSM-5 zeolites for Steam enhanced catalytic cracking of crude oil and other hydrocarbon feeds.

The present disclosure is directed to steam catalytic cracking of crude oil using a cracking catalyst to convert the crude oil to greater value hydrocarbon products, such as but not limited to light olefins, aromatic compounds, or combinations of these. A process for converting a hydrocarbon feed may comprise contacting a hydrocarbon feed with steam in the presence of a cracking catalyst under steam enhanced catalytic cracking conditions. The contacting the hydrocarbon feed with the steam and the cracking catalyst may cause at least a portion of the hydrocarbon feed to undergo steam catalytic cracking reactions to produce a cracked effluent comprising $C_2$ to $C_4$ olefins, $C_6$ to $C_{10}$ aromatic compounds, or both. The cracking catalyst may be a nanoparticle comprising a core and a shell. The core may comprise one or more ZSM-5 zeolite particles and have an outer surface. The shell may comprise a plurality of fibers extending radially outward from the outer surface of the core. The plurality of fibers may comprise silica. The cracking catalyst may be produced by a zeolite-seed-assisted micro-emulsion method. The fibrous shell of the cracking catalysts of the present disclosure can improve access to reactive sites on the ZSM-5 zeolites in the core and reduce blockage by large molecules from the crude oil.

Referring now to FIG. 1, a process 100 of the present disclosure for converting a hydrocarbon feed 102 to a cracked effluent 140 may include contacting the hydrocarbon feed 102 with steam in the presence of the cracking catalyst 132 at steam enhanced catalytic cracking conditions.

The hydrocarbon feed 102 may include one or more heavy oils, such as but not limited to crude oil, bitumen, oil sand, shale oil, coal liquids, vacuum residue, tar sands, other heavy oil streams, or combinations of these heavy oils. It should be understood that, as used in this disclosure, a "heavy oil" refers to a raw hydrocarbon, such as whole crude oil, which has not been previously processed through distillation, or may refer to a hydrocarbon oil, which has undergone some degree of processing prior to being introduced to the process 100 as the hydrocarbon feed 102. The hydrocarbon feed 102 may have a density of greater than or equal to 0.80 grams per milliliter. The hydrocarbon feed 102 may have an end boiling point (EBP) of greater than 565° C. The hydrocarbon feed 102 may have a concentration of nitrogen of less than or equal to 3000 parts per million by weight (ppmw).

In embodiments, the hydrocarbon feed 102 may be a crude oil, such as whole crude oil, or synthetic crude oil. The crude oil may have an American Petroleum Institute (API) gravity of from 22 degrees to 52 degrees, such as from 25 degrees to 52 degrees, from 22 degrees to 40 degrees, from 25 degrees to 50 degrees, or from 25 degrees to 40 degrees. In embodiments, the hydrocarbon feed 102 may include an extra light crude oil, a light crude oil, a heavy crude oil, or combinations of these. In embodiments, the hydrocarbon feed 102 can be a light crude oil, such as but not limited to an Arab heavy crude oil, an Arab medium crude oil, an Arab light (AL) export crude oil, an Arab extra light crude oil, or an Arab super light crude oil. Example properties for an exemplary grade of Arab light crude oil are provided in Table 1.

TABLE 1

Example of AL Export Feedstock

| Analysis | Units | Value | Test Method |
|---|---|---|---|
| American Petroleum Institute (API) gravity | degree | 33.13 | ASTM D287 |
| Density | grams per milliliter (g/mL) | 0.8595 | ASTM D287 |
| Carbon Content | weight percent (wt. %) | 85.29 | ASTM D5291 |
| Hydrogen Content | wt. % | 12.68 | ASTM D5292 |
| Sulfur Content | wt. % | 1.94 | ASTM D5453 |
| Nitrogen Content | parts per million by weight (ppmw) | 849 | ASTM D4629 |
| Asphaltenes | wt. % | 1.2 | ASTM D6560 |
| Micro Carbon Residue (MCR) | wt. % | 3.4 | ASTM D4530 |
| Vanadium (V) Content | ppmw | 15 | IP 501 |
| Nickel (Ni) Content | ppmw | 12 | IP 501 |
| Arsenic (As) Content | ppmw | 0.04 | IP 501 |
| Boiling Point Distribution | | | |
| Initial Boiling Point (IBP) | Degrees Celsius (° C.) | 33 | ASTM D7169 |
| 5% Boiling Point (BP) | ° C. | 92 | ASTM D7169 |
| 10% BP | ° C. | 133 | ASTM D7169 |

TABLE 1-continued

Example of AL Export Feedstock

| Analysis | Units | Value | Test Method |
|---|---|---|---|
| 20% BP | ° C. | 192 | ASTM D7169 |
| 30% BP | ° C. | 251 | ASTM D7169 |
| 40% BP | ° C. | 310 | ASTM D7169 |
| 50% BP | ° C. | 369 | ASTM D7169 |
| 60% BP | ° C. | 432 | ASTM D7169 |
| 70% BP | ° C. | 503 | ASTM D7169 |
| 80% BP | ° C. | 592 | ASTM D7169 |
| 90% BP | ° C. | >720 | ASTM D7169 |
| 95% BP | ° C. | >720 | ASTM D7169 |
| End Boiling Point (EBP) | ° C. | >720 | ASTM D7169 |
| BP range C5-180° C. | wt. % | 18.0 | ASTM D7169 |
| BP range 180° C.-350° C. | wt. % | 28.8 | ASTM D7169 |
| BP range 350° C.-540° C. | wt. % | 27.4 | ASTM D7169 |
| BP range > 540° C. | wt. % | 25.8 | ASTM D7169 |

Weight percentages in Table 1 are based on the total weight of the crude oil.

In embodiments, the hydrocarbon feed 102 may be an Arab Extra Light (AXL) crude oil. An example boiling point distribution for an exemplary grade of an AXL crude oil is provided in Table 2.

TABLE 2

Example of AXL Export Feedstock

| Property | Units | Value | Test Method |
|---|---|---|---|
| 0.1% Boiling Point (BP) | ° C. | 21 | ASTM D7169 |
| 5% BP | ° C. | 65 | ASTM D7169 |
| 10% BP | ° C. | 96 | ASTM D7169 |
| 15% BP | ° C. | 117 | ASTM D7169 |
| 20% BP | ° C. | 141 | ASTM D7169 |
| 25% BP | ° C. | 159 | ASTM D7169 |
| 30% BP | ° C. | 175 | ASTM D7169 |
| 35% BP | ° C. | 196 | ASTM D7169 |
| 40% BP | ° C. | 216 | ASTM D7169 |
| 45% BP | ° C. | 239 | ASTM D7169 |
| 50% BP | ° C. | 263 | ASTM D7169 |
| 55% BP | ° C. | 285 | ASTM D7169 |
| 60% BP | ° C. | 308 | ASTM D7169 |
| 65% BP | ° C. | 331 | ASTM D7169 |
| 70% BP | ° C. | 357 | ASTM D7169 |
| 75% BP | ° C. | 384 | ASTM D7169 |
| 80% BP | ° C. | 415 | ASTM D7169 |
| 85% BP | ° C. | 447 | ASTM D7169 |
| 90% BP | ° C. | 486 | ASTM D7169 |
| 95% BP | ° C. | 537 | ASTM D7169 |
| End Boiling Point (EBP) | ° C. | 618 | ASTM D7169 |

The hydrocarbon feed 102 may have a sulfur content of from 0.05 wt. % to 3 wt. %. In embodiments, the hydrocarbon feed 102 may have a sulfur content of from 0.05 wt. % to 2.75 wt. %, from 0.05 wt. % to 2.50 wt. %, from 0.05 wt. % to 2.25 wt. %, from 0.05 wt. % to 2.00 wt. %, from 0.1 wt. % to 3 wt. %, from 0.5 wt. % to 3 wt. %, from 1 wt. % to 3 wt. %, from 1.5 wt. % to 3 wt. %, from 1.5 wt. % to 2.5 wt. %, or any subset thereof.

When the hydrocarbon feed 102 comprises a crude oil, the crude oil may be a whole crude or may be a crude oil that has undergone at least some processing, such as desalting, solids separation, scrubbing. In embodiments, the hydrocarbon feed 102 may be a de-salted crude oil that has been subjected to a de-salting process. In embodiments, the hydrocarbon feed 102 may include a crude oil that has not undergone pretreatment, separation (such as distillation), or other operation or process that changes the hydrocarbon composition of the crude oil prior to introducing the crude oil to the process 100.

In embodiments, the hydrocarbon feed 102 can be a crude oil having a boiling point profile as described by the 5 wt. % boiling temperature, the 25 wt. % boiling temperature, the 50 wt. % boiling temperature, the 75 wt. % boiling temperature, and the 95 wt. % boiling temperature. These respective boiling temperatures correspond to the temperatures at which a given weight percentage of the hydrocarbon feed stream boils. In embodiments, the crude oil may have one or more of a 5 wt. % boiling temperature of less than or equal to 150° C.; a 25 wt. % boiling temperature of less than or equal to 225° C. or less than or equal to 200° C.; a 50 wt. % boiling temperature of less than or equal to 500° C., less than or equal 450° C., or less than or equal to 400° C.; a 75 wt. % boiling temperature of less than 600° C., less than or equal to 550° C.; a 95 wt. % boiling temperature of greater than or equal to 550° C. or greater than or equal to 600° C.; or combinations of these. In embodiments, the crude oil may have one or more of a 5 wt. % boiling temperature of from 0° C. to 100° C.; a 25 wt. % boiling temperature of from 150° C. to 250° C., a 50 wt. % boiling temperature of from 250° C. to 400° C., a 75 wt. % boiling temperature of from 350° C. to 600° C. and an end boiling point temperature of from 500° C. to 1000° C., such as from 500° C. to 800° C.

Referring again to FIG. 1, one embodiment of a steam catalytic cracking system 110 for steam catalytic cracking a hydrocarbon feed 102 is schematically depicted. The steam catalytic cracking system 110 may include at least one steam catalytic cracking reactor 130. The steam catalytic cracking reactor 130 may include one or more fixed bed reactors, fluid bed reactors, batch reactors, fluid catalytic cracking (FCC) reactors, moving bed catalytic cracking reactors, or combinations of these. In embodiments, the steam catalytic cracking reactor 130 may be a fixed bed reactor. In embodiments, the steam catalytic cracking reactor 130 may include a plurality of fixed bed reactors operated in a swing mode. Operation of the steam catalytic cracking reactor 130 will be described herein in the context of a fixed bed reactor. However, it is understood that other types of reactors, such as a fluid bed reactors, batch reactors, FCC reactors, or moving bed reactors, may also be used to contact the hydrocarbon feed 102 with the cracking catalyst to conduct the steam catalytic cracking of the process disclosed herein.

The steam catalytic cracking reactor 130 may operate to contact the hydrocarbon feed 102 with steam in the presence of the cracking catalyst 132 of the present disclosure to produce a cracked effluent 140 comprising light olefins, aromatic compounds, or combinations of these. As previously discussed, the steam catalytic cracking reactor 130 may be a fixed bed catalytic cracking reactor that may include the cracking catalyst 132 disposed within a steam catalytic cracking zone 134. The steam catalytic cracking reactor 130 may include a porous packing material 136, such as silica carbide packing or Kaolin clay, disposed upstream of the steam catalytic cracking zone 134. The porous packing material 136 may ensure sufficient heat transfer to the hydrocarbon feed 102 and steam prior to conducting the steam catalytic cracking reaction in the steam catalytic cracking zone 134.

Referring again to FIG. 1, the hydrocarbon feed 102 may be introduced to the steam catalytic cracking reactor 130. In embodiments, the hydrocarbon feed 102 may be introduced directly to the steam catalytic cracking system 110, such as by passing the crude oil of the hydrocarbon feed 102 to the steam catalytic cracking reactor 130 without passing the hydrocarbon feed 102 to any separation system or unit operation that changes the hydrocarbon composition of the hydrocarbon feed 102. In embodiments, the hydrocarbon feed 102 may be processed upstream of the steam catalytic cracking system 110 to remove contaminants, such as but not limited to nitrogen compounds, sulfur-containing compounds, heavy metals, or other contaminants that may reduce the effectiveness of the cracking catalyst.

The processes disclosed herein can include introducing the hydrocarbon feed 102 to the steam catalytic cracking system 110, such as introducing the hydrocarbon feed 102 to the steam catalytic cracking reactor 130. Introducing the hydrocarbon feed 102 to the steam catalytic cracking reactor 130 may include heating the hydrocarbon feed 102 to a temperature of from 35° C. to 150° C. and then passing the hydrocarbon feed 102 to the steam catalytic cracking reactor 130. In embodiments, the hydrocarbon feed 102 may be heated to a temperature of from 40° C. to 150° C., from 45° C. to 150° C., from 50° C. to 150° C., from 35° C. to 145° C., from 40° C. to 145° C., from 45° C. to 145° C., from 35° C. to 140° C., from 40° C. to 140° C., or from 45° C. to 140° C.

In embodiments, passing the hydrocarbon feed 102 to the steam catalytic cracking reactor 130 may include passing the hydrocarbon feed 102 to a feed pump 104, where the feed pump 104 may increase the pressure of the hydrocarbon feed 102 and convey the hydrocarbon feed 102 to the steam catalytic cracking reactor 130. The flowrate of the feed pump 104 may be adjusted so that the hydrocarbon feed 102 is injected into the steam catalytic cracking reactor 130 at a gas hourly space velocity of greater than or equal to 0.1 per hour ($h^{-1}$) or greater than or equal to 0.25 $h^{-1}$. The hydrocarbon feed 102 may be injected into the steam catalytic cracking reactor 130 at a gas hourly space velocity of less than or equal to 50 $h^{-1}$, less than or equal to 25 $h^{-1}$, less than or equal to 20 $h^{-1}$, less than or equal to 14 $h^{-1}$, less than or equal to 9 $h^{-1}$, or less than or equal to 5 $h^{-1}$. The hydrocarbon feed 102 may be injected into the steam catalytic cracking reactor 130 at a gas hourly space velocity of from 0.1 $h^{-1}$ to 50 $h^{-1}$, from 0.1 $h^{-1}$ to 25 $h^{-1}$, from 0.1 $h^{-1}$ to 20 $h^{-1}$, from 0.1 $h^{-1}$ to 14 $h^{-1}$, from 0.1 $h^{-1}$ to 9 $h^{-1}$, from 0.1 $h^{-1}$ to 5 $h^{-1}$, from 0.1 $h^{-1}$ to 4 $h^{-1}$, from 0.25 $h^{-1}$ to 50 $h^{-1}$, from 0.25 $h^{-1}$ to 25 $h^{-1}$, from 0.25 $h^{-1}$ to 20 $h^{-1}$, from 0.25 $h^{-1}$ to 14 $h^{-1}$, from 0.25 $h^{-1}$ to 9 $h^{-1}$, from 0.25 $h^{-1}$ to 5 $h^{-1}$, from 0.25 $h^{-1}$ to 4 $h^{-1}$, from 1 $h^{-1}$ to 50 $h^{-1}$, from 1 $h^{-1}$ to 25 $h^{-1}$, from 1 $h^{-1}$ to 20 $h^{-1}$, from 1 $h^{-1}$ to 14 $h^{-1}$, from 1 $h^{-1}$ to 9 $h^{-1}$, or from 1 $h^{-1}$ to 5 $h^{-1}$ via feed inlet line 106. The hydrocarbon feed 102 may be further pre-heated in the feed inlet line 106 to a temperature of from 100° C. to 250° C. before injecting the hydrocarbon feed 102 into the steam catalytic cracking reactor 130.

Water 120 may be injected to the steam catalytic cracking reactor 130 through water feed line 122 via the water feed pump 124. The water feed line 122 may be pre-heated to heat the water 120 at to a temperature of from 50° C. to 175° C., from 50° C. to 150° C., from 60° C. to 175° C., or from 60° C. to 170° C. The water 120 may be converted to steam in water feed line 122 or upon contact with the hydrocarbon feed 102 in the steam catalytic cracking reactor 130. The flowrate of the water feed pump 124 may be adjusted to deliver the water 120 (liquid, steam, or both) to the steam catalytic cracking reactor 130 at a gas hourly space velocity of greater than or equal to 0.1 $h^{-1}$, greater than or equal to 0.5 $h^{-1}$, greater than or equal to 1 $h^{-1}$, greater than or equal to 5 $h^{-1}$, greater than or equal to 6 $h^{-1}$, greater than or equal to 10 $h^{-1}$, or even greater than or equal to 15 $h^{-1}$. The water 120 may be introduced to the steam catalytic cracking reactor 130 at a gas hourly space velocity of less than or equal to 100 $h^{-1}$, less than or equal to 75 $h^{-1}$, less than or equal to 50 $h^{-1}$, less than or equal to 30 $h^{-1}$, or less than or equal to 20 h$^{-1}$. The water 120 may be introduced to the steam catalytic cracking reactor 130 at a gas hourly space velocity of from 0.1 h$^{-1}$ to 100 h$^{-1}$, from 0.1 h$^{-1}$ to 75 h$^{-1}$, from 0.1 h$^{-1}$ to 50 h$^{-1}$, from 0.1 h$^{-1}$ to 30 h$^{-1}$, from 0.1 h$^{-1}$ to 20 h$^{-1}$, from 1 h$^{-1}$ to 100 h$^{-1}$, from 1 h$^{-1}$ to 75 h$^{-1}$, from 1 h$^{-1}$ to 50 h$^{-1}$, from 1 h$^{-1}$ to 30 h$^{-1}$, or from 1 h$^{-1}$ to 20 h$^{-1}$.

The steam from injection of the water 120 into the steam catalytic cracking reactor 130 may reduce the hydrocarbon partial pressure, which may have the dual effects of increasing yields of light olefins (e.g., ethylene, propylene and butene) as well as reducing coke formation on the cracking catalyst. Not intending to be limited by any particular theory, it is believed that light olefins like propylene and butenes are mainly generated from catalytic cracking reactions following the carbonium ion mechanism, and as these are intermediate products, they can undergo secondary reactions such as hydrogen transfer and aromatization (leading to coke formation). The steam may increase the yield of light olefins by suppressing these secondary bi-molecular reactions, and may reduce the concentration of reactants and products, which favor selectivity towards light olefins. The steam may also suppresses secondary reactions that are responsible for coke formation on catalyst surfaces, which is good for catalysts to maintain high average activation. These factors may show that a large steam-to-oil weight ratio may be beneficial to the production of light olefins.

The mass flow rate of the water 120 to the steam catalytic cracking reactor 130 may be less than the mass flow rate of the hydrocarbon feed 102 to the steam catalytic cracking reactor 130. In embodiments, a mass flow ratio of the water 120 to the hydrocarbon feed 102 introduced to the steam catalytic cracking reactor 130 can be less than 1, such as less than or equal to 0.9, less than or equal to 0.8, less than or equal to 0.7, or less than or equal to 0.6. In embodiments, the mass flow ratio of the water 120 to the hydrocarbon feed 102 introduced to the steam catalytic cracking reactor 130 can be from 0.2 to less than 1, from 0.2 to 0.9, from 0.2 to 0.8, from 0.2 to 0.7, from 0.2 to 0.6, from 0.3 to less than 1, from 0.3 to 0.9, from 0.3 to 0.8, from 0.3 to 0.7, from 0.3 to 0.6, from 0.4 to less than 1, from 0.4 to 0.9, from 0.4 to 0.8, from 0.4 to 0.7, from 0.4 to 0.6, from 0.5 to less than 1, from 0.5 to 0.9, from 0.5 to 0.8, from 0.5 to 0.7, from 0.5 to 0.6. In embodiments, the mass flow ratio of the water 120 to the hydrocarbon feed 102 introduced to the steam catalytic cracking reactor 130 can be about 0.5. The water may be present as steam in the steam catalytic cracking reactor 130.

Referring again to FIG. 1, the steam catalytic cracking system 110 may be operable to contact the hydrocarbon feed 102 with steam (from water 120) in the presence of the cracking catalyst in the steam catalytic cracking reactor 130 under reaction conditions sufficient to cause at least a portion of the hydrocarbons from the hydrocarbon feed 102 to undergo one or more cracking reactions to produce a cracked effluent 140 comprising light olefins, light aromatic compounds, or both. In embodiments, the cracked effluent 140 may comprise light olefins, which may include but are not limited to ethylene, propylene, butenes, or combinations of these. In embodiments, the cracked effluent 140 may comprise light aromatic compounds, which refers to compounds containing an aromatic ring structure and having less than or equal to 10 carbon atoms. The light aromatic compounds in the cracked effluent 140 may include but are not limited to benzene, toluene, ethylbenzene, xylenes, or other light aromatic compounds.

The steam catalytic cracking reactor 130 may be operated at a weighted average bed temperature (WABT) temperature of greater than or equal to 100° C., greater than or equal to 250° C., greater than or equal to 500° C. greater than or equal to 525° C., greater than or equal to 550° C., greater than or equal to 575° C., or even greater than or equal to 600° C. The steam catalytic cracking reactor 130 may be operated at a WABT of less than or equal to 800° C., less than or equal to 700° C., less than or equal to 750° C., less than or equal to 700° C., or even less than or equal to 675° C. The steam catalytic cracking reactor 130 may be operated at a WABT of from 100° C. to 800° C., from 100° C. to 700° C., from 100° C. to 600° C., from 250° C. to 800° C., from 525° C. to 800° C., from 525° C. to 750° C., from 525° C. to 700° C., from 525° C. to 675° C., from 550° C. to 750° C., from 550° C. to 700° C., from 550° C. to 675° C., from 575° C. to 750° C., from 575° C. to 700° C., from 575° C. to 675° C., from 600° C. to 750° C., from 600° C. to 700° C., or from 600° C. to 675° C. In embodiments, the steam catalytic cracking reactor 130 may be operated at a WABT of about 675° C. The process may operate at atmospheric pressure (approximately from 100 kilopascals (kPa) to 200 kPa).

The methods of the present disclosure may include contacting the hydrocarbon feed 102 with the steam (water 120) in the presence of the cracking catalyst 132 in the steam catalytic cracking reactor 130 for a residence time sufficient to convert at least a portion of the hydrocarbon compounds in the hydrocarbon feed 102 to light olefins, light aromatic compounds, or both. In embodiments, the methods may include contacting the hydrocarbon feed 102 with the steam (water 120) in the presence of the cracking catalyst 132 in the steam catalytic cracking reactor 130 for a residence time of from 1 second to 60 seconds, such as from 1 second to 30 seconds, from 1 second to 10 seconds, or about 10 seconds.

When the steam catalytic cracking reactor 130 is a fixed bed reactor, the steam catalytic cracking reactor 130 may be operated in a semi-continuous manner. For example, during a conversion cycle, the steam catalytic cracking reactor 130 may be operated with the hydrocarbon feed 102 and water 120 flowing to the steam catalytic cracking reactor 130 for a period of time. After the period of the time, the cracking catalyst may be regenerated. Each conversion cycle of the steam catalytic cracking reactor 130 may be from 2 to 24 hours, from 2 to 20 hours, from 2 to 16 hours, from 2 to 12 hours, from 2 to 10 hours, from 2 to 8 hours, from 4 to 24 hours, from 4 to 20 hours, from 4 to 16 hours, from 4 to 12 hours, from 4 to 10 hours, from or 4 to 8 hours before switching off the feed pump 104 and the water feed pump 124 to cease the flow of the hydrocarbon feed 102 and water 120 to the steam catalytic cracking reactor 130.

At the end of the conversion cycle, the flow of hydrocarbon feed 102 and water 120 may be stopped and the cracking catalyst 132 may be regenerated during a regeneration cycle. In embodiments, the steam catalytic cracking system 110 may include a plurality of fixed bed steam catalytic cracking reactors 130, which may be operated in parallel or in series. In embodiments, the steam catalytic cracking system 110 may include 1, 2, 3, 4, 5, 6, or more than 6 steam catalytic cracking reactors 130, which may be operated in series or in parallel. With a plurality of steam catalytic cracking reactors 130 operating in parallel, one or more of the steam catalytic cracking reactors 130 can continue in a conversion cycle while one or more of the other steam catalytic cracking reactors 130 are taken off-line for regeneration of the cracking catalyst 132, thus maintaining continuous operation of the steam catalytic cracking system 110.

Referring again to FIG. 1, during a regeneration cycle, the steam catalytic cracking reactor 130 may be operated to regenerate the cracking catalyst 132. The cracking catalyst 132 may be regenerated to remove coke deposits accumulated during the conversion cycle. To regenerate the cracking catalyst 132, hydrocarbon gas and liquid products produced by the steam catalytic cracking process may be evacuated from the steam catalytic cracking reactor 130. Nitrogen gas may be introduced to the steam catalytic cracking reactor 130 through gas inlet line 112 to evacuate the hydrocarbon gas and liquid products from the fixed bed steam catalytic cracking reactor 130. Nitrogen may be introduced to the steam catalytic cracking reactor 130 at gas hourly space velocity of from 10 per hour ($h^{-1}$) to 100 $h^{-1}$.

Following evacuation of the hydrocarbon gases and liquids, air may be introduced to the steam catalytic cracking reactor 130 through the gas inlet line 112 at a gas hourly space velocity of from 10 $h^{-1}$ to 100 $h^{-1}$. The air may be passed out of the steam catalytic cracking reactor 130 through air outlet line 142. While passing air through the cracking catalyst 132 in the steam catalytic cracking reactor 130, the temperature of the steam catalytic cracking reactor 130 may be increased from the reaction temperature to a regeneration temperature of from 650° C. to 750° C. for a period of from 3 hours to 5 hours. The gas produced by air regeneration of the cracking catalyst 132 may be passed out of the steam catalytic cracking reactor 130 and may be analyzed by an in-line gas analyzer to detect the presence or concentration of carbon dioxide produced through de-coking of the cracking catalyst 132. Once the carbon dioxide concentration in the gases passing out of the steam catalytic cracking reactor 130 are reduced to less than 0.1% by weight, or even less than 0.05% by weight, as determined by the in-line gas analyzer, the temperature of the steam catalytic cracking reactor 130 may be decreased from the regeneration temperature back to the reaction temperature. The air flow through gas inlet line 112 may be stopped. Nitrogen gas may be passed through the cracking catalyst 132 for 15 minutes to 30 minutes to remove air from the steam catalytic cracking reactor 130. Following treatment with nitrogen, the flows of the hydrocarbon feed 102 and water 120 may be resumed to begin another conversion cycle of steam catalytic cracking reactor 130. Although described herein in the context of a fixed bed reactor system, it is understood that the steam catalytic cracking reactor 130 can be a different type of reactor, such as a fluidized bed reactor, a moving bed reactor, a batch reactor, an FCC reactor, or combinations of these.

Figure 2:
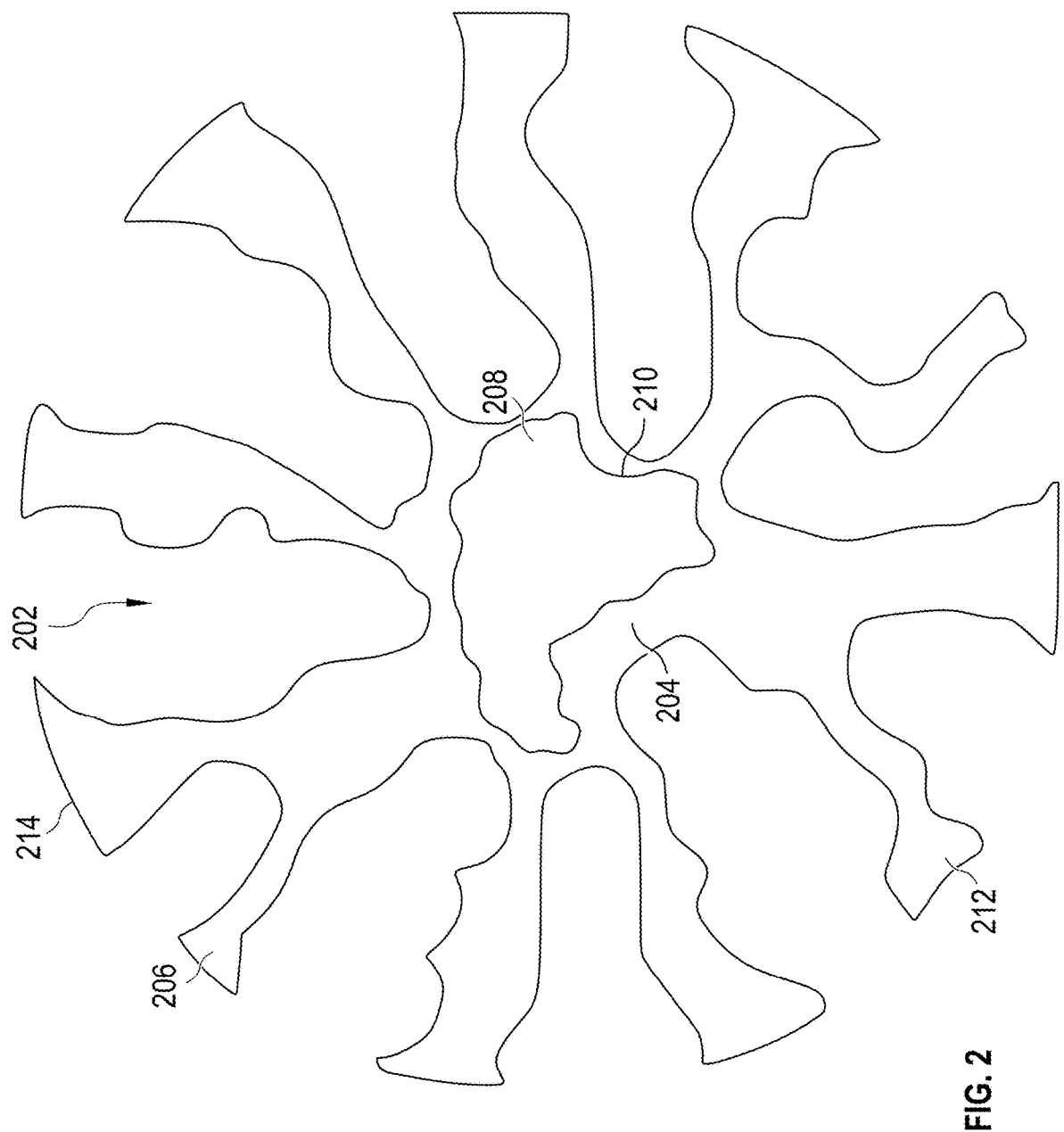
FIG. 2 schematically depicts a cross-sectional diagram of a cracking catalyst comprising a core and a plurality of fibers extending radially outward from the core, according to one or more embodiments shown and described in the present disclosure.

Referring now to FIG. 2, the cracking catalyst 202 may be a nanoparticle comprising, consisting essentially of, or consisting of: a core 204 and a shell 206. The core 204 may comprise one or more ZSM-5 zeolite particles 208 and may have an outer surface 210. The shell 206 may comprise a plurality of fibers extending radially outward from the outer surface 210 of the core 204 and the plurality of fibers 212 may comprise silica.

As described above, the core 204 may comprise one or more ZSM-5 zeolite particles 208 and may have an outer surface 210. The core 204 may comprise a one or more ZSM-5 zeolite particles 208, such as a single ZSM-5 zeolite particle 208. In embodiments, the core 204 may consist of a single ZSM-5 zeolite particle 208, silica, and optionally alumina. In further embodiments, the core 204 may consist of the ZSM-5 zeolite particles 208, such as a single ZSM-5 zeolite particle 208.

The one or more ZSM-5 zeolite particles 208 may be conventional, microporous ZSM-5 zeolite. The one or more ZSM-5 zeolite particles 208 may have a molar ratio of silica to alumina of from 10 to 100. In embodiments, the one or more ZSM-5 zeolite particles 208 may have a molar ratio of silica to alumina of from 10 to 90, from 10 to 80, from 10 to 70, from 10 to 60, from 20 to 100, from 20 to 90, from 20 to 80, from 20 to 70, from 20 to 60, from 30 to 100, from 30 to 80, from 30 to 60, from 40 to 100, from 40 to 80, from 40 to 60, from 50 to 100, from 50 to 80, from 50 to 60, or any subset thereof.

The one or more ZSM-5 zeolite particles 208 may have a surface area of from 100 $m^2/g$ to 1000 $m^2/g$. In embodiments, the one or more ZSM-5 zeolite particles 208 may have a surface area of from 100 $m^2/g$ to 800 $m^2/g$, from 100 $m^2/g$ to 600 $m^2/g$, from 200 $m^2/g$ to 1000 $m^2/g$, from 300 $m^2/g$ to 1000 $m^2/g$, from 200 $m^2/g$ to 800 $m^2/g$, from 300 $m^2/g$ to 600 $m^2/g$, from 350 $m^2/g$ to 450 $m^2/g$, or any subset thereof.

The one or more ZSM-5 zeolite particles 208 may have an average pore size of less than 2 nm. In embodiments, the one or more ZSM-5 zeolite particles 208 may have an average pore size of less than 1.8 nm, less than 1.6 nm, less than 1.4 nm, less than 1.2 nm, less than 1 nm, less than 0.8 nm, from 0.2 nm to 2 nm, from 0.2 nm to 1.8 nm, or any subset thereof.

The one or more ZSM-5 zeolite particles 208 may have an average particle size of less than 300 nm. The average particle size of the ZSM-5 zeolite particles 208 refers to the largest dimension across the ZSM-5 zeolite particle averaged over all or a subset of the particles. For the ZSM-5 zeolite particles which have a spherical shape, the average particle size of the ZSM-5 zeolite particles 208 is equal to the average diameter of the ZSM-5 zeolite particles 208. In embodiments, the one or more ZSM-5 zeolite particles 208 may have an average particle size of less than 250 nm, less than 200 nm, less than 175 nm, from 100 nm to 300 nm, from 100 nm to 250 nm, from 100 nm to 200 nm, from 125 nm to 175 nm, or any subset thereof.

The outer surface 210 of the core 204 may comprise ZSM-5 zeolite or silica and optionally alumina. In embodiments, the outer surface 210 of the core 204 may comprise ZSM-5 zeolite.

In embodiments, the core 204 may comprise the ZSM-5 zeolite particles 208 and silica, and optionally alumina. The silica, and optionally alumina, in the core 204 may form a matrix which holds the one or more ZSM-5 zeolite particles 208. The silica, and optionally alumina, in the core 204 may be amorphous or crystalline.

The core 204 may have a greater concentration of ZSM-5 zeolite particles 208 than the shell 206. In embodiments, the mass concentration of ZSM-5 zeolite particles 208 in the core 204 may be at least 5 percentage points, at least 10 percentage points, at least 15 percentage points, at least 20 percentage points, at least 25 percentage points, at least 50 percentage points, at least 75 percentage points, or even at least 90 percentage point greater than the mass concentration of ZSM-5 zeolite particles 208 in the shell 206, based on the total weights of the core and the shell.

As discussed above, the shell 206 may comprise a plurality of fibers 212 extending radially outward from the outer surface 210 of the core 204 and the plurality of fibers 212 may comprise silica. The plurality of fibers 212 may further comprise alumina. The plurality of fibers 212 may comprise, consist essentially of, or consist of silica and, optionally, alumina. The silica and optional alumina in the plurality of fibers 212 may be in amorphous or crystalline form.

In embodiments, some ZSM-5 may be distributed within the plurality of fibers 212. In embodiments, the plurality of fibers 212 may comprise less than 10 wt. %, less than 5 wt. %, less than 2.5 wt. %, less than 1 wt. %, or even less than 0.1 wt. % of ZSM-5 zeolite.

The shell 206 may have a silica:alumina molar ratio of from 100:0 to 1:1. In embodiments, the shell 206 may have a silica:alumina molar ratio of from 100:0 to 5:4, from 100:0 to 5:3, from 100:0 to 5:2, from 100:0 to 5:1, from 100:0 to 10:1, from 100:0 to 20:1, from 100:0 to 40:1, from 100:0 to 60:1, from 100:0 to 80:1, from 100:0 to 100:1.

In embodiments, the plurality of fibers may be of varying thickness and lengths. In embodiments, the plurality of fibers may be of uniform thickness and uniform length. The plurality of fibers 212 on each of the particles of the cracking catalyst 202 may have a median length of between about 1 nm and about 1000 nm, which is measured as a distance from an outer surface 210 of the core 204 to a radially outer end 214 of each of the plurality of fibers 212. In embodiments, the plurality of fibers 212 on each of the cracking catalysts 202 may have a median length of from 1 nm to 500 nm, from 1 nm to 250 nm, from 25 nm to 1000 nm, from 25 nm to 500 nm, from 25 nm to 250 nm, or any subset thereof.

The plurality of fibers 212 on each of the particles of the cracking catalyst 202 may have a median thickness of between about 1 nm and about 50 nm. In embodiments, the plurality of fibers 212 on each of the cracking catalysts 202 may have a median thickness of from 1 nm to 40 nm, from 1 nm to 25 nm, from 1 nm to 10 nm, from 5 nm to 50 nm, from 5 nm to 25 nm, from 5 nm to 15 nm, from 10 nm to 50 nm, from 10 nm to 25 nm, or any subset thereof.

The cracking catalyst may comprise at least 80 wt. % of the combined weight of silica, zeolite, and, optionally alumina, based on the total weigh of the cracking catalyst. In embodiments, the cracking catalyst may comprise at least 90 wt. %, at least 95 wt. %, at least 99 wt. %, at least 99.9 wt. %, or even at least 99.999 wt. % of the combined weight of silica, zeolite, and optionally alumina, based on the total weight of the cracking catalyst.

The cracking catalyst may comprise from 50 weight percent (wt. %) to 95 wt. % of the zeolite, based on the total weight of the cracking catalyst. For Example, the cracking may comprise from 60 wt. % to 95 wt. %, from 70 wt. % 95 wt. %, from 75 wt. % to 95 wt. %, from 60 wt. % to 90 wt. %, from 60 wt. % to 85 wt. %, from 70 wt. % to 90 wt. %, from 75 wt. % to 85 wt. %, form 77.5 wt. % to 82.5 wt. %, or any subset thereof, of the zeolite, based on the total weight of the cracking catalyst.

The cracking catalyst may comprise from 5 wt. % to 50 wt. % silica and from 50 wt. % to 95 wt. % ZSM-5 zeolite, where the weight percentages are based on the total weight of the cracking catalyst. In embodiments, the cracking catalyst may comprise from 5 wt. % to 45 wt. %, from 5 wt. % to 40 wt. %, from 5 wt. % to 30 wt. %, from 5 wt. % to 20 wt. %, from 5 wt. % to 15 wt. %, from 5 wt. % to 10 wt. %, from 10 wt. % to 50 wt. %, from 15 wt. % to 50 wt. %, from 25 wt. % to 50 wt. %, from 35 wt. % to 50 wt. %, from 10 wt. % to 45 wt. %, from 20 wt. % to 35 wt. %, or any subset thereof, of silica, based on the total weight of the cracking catalyst.

The cracking catalyst may comprise from 0 wt. % to 5 wt. % alumina, based on the total weight of the cracking catalyst. In embodiments, the cracking catalyst may comprise from 0 wt. % to 4 wt. %, from 0 wt. % to 3 wt. %, from 0 wt. % to 2 wt. %, from 0.1 wt. % to 5 wt. %, from 0.1 wt. % to 4 wt. %, from 0.1 wt. % to 3 wt. %, from 0.1 wt. % to 2 wt. %, from 0.5 wt. % to 5 wt. %, from 0.5 wt. % to 4 wt. %, from 0.5 wt. % to 3 wt. %, from 0.5 wt. % to 2 wt. %, from 0.5 wt. % to 1.5 wt. %, from 0.75 wt. % to 5 wt. %, from 0.75 wt. % to 2.5 wt. %, from 0.75 wt. % to 1.5 wt. %, from 0.75 wt. % to 1.25 wt. %, from 0.9 wt. % to 1.1 wt. %, or any subset thereof of alumina, based on the total weight of the cracking catalyst.

The cracking catalyst may comprise from 50 wt. % to 95 wt. %, from 60 wt. % to 95 wt. %, from 70 wt. % 95 wt. %, from 75 wt. % to 95 wt. %, from 60 wt. % to 90 wt. %, from 60 wt. % to 85 wt. %, from 70 wt. % to 90 wt. %, from 75 wt. % to 85 wt. %, form 77.5 wt. % to 82.5 wt. %, or any subset thereof, of the zeolite; from 5 wt. % to 50 wt. %, from 5 wt. % to 45 wt. %, from 5 wt. % to 40 wt. %, from 5 wt. % to 30 wt. %, from 5 wt. % to 20 wt. %, from 5 wt. % to 15 wt. %, from 5 wt. % to 10 wt. %, from 10 wt. % to 50 wt. %, from 15 wt. % to 50 wt. %, from 25 wt. % to 50 wt. %, from 35 wt. % to 50 wt. %, from 10 wt. % to 45 wt. %, from 20 wt. % to 35 wt. %, or any subset thereof, of silica; from 0 wt. % to 5 wt. %, from 0 wt. % to 4 wt. %, from 0 wt. % to 3 wt. %, from 0 wt. % to 2 wt. %, from 0.1 wt. % to 5 wt. %, from 0.1 wt. % to 4 wt. %, from 0.1 wt. % to 3 wt. %, from 0.1 wt. % to 2 wt. %, from 0.5 wt. % to 5 wt. %, from 0.5 wt. % to 4 wt. %, from 0.5 wt. % to 3 wt. %, from 0.5 wt. % to 2 wt. %, from 0.5 wt. % to 1.5 wt. %, from 0.75 wt. % to 5 wt. %, from 0.75 wt. % to 2.5 wt. %, from 0.75 wt. % to 1.5 wt. %, from 0.75 wt. % to 1.25 wt. %, from 0.9 wt. % to 1.1 wt. %, or any subset thereof, of alumina; based on the total weight of the cracking catalyst.

The cracking catalyst may have an overall molar ratio of silica to alumina of from 5 to 100. In embodiments, the cracking catalyst may have an overall molar ratio of silica to alumina of from 5 to 90, from 5 to 80, from 5 to 70, from 5 to 60, from 5 to 50, from 5 to 40, from 15 to 100, from 15 to 80, from 15 to 70, from 15 to 60, from 15 to 50, from 20 to 100, from 20 to 80, from 20 to 70, from 20 to 60, from 30 to 80, from 30 to 70, from 30 to 60, from 40 to 60, from 44 to 55, or any subset thereof.

The cracking catalyst may have a bimodal pore size distribution with a first peak at from 2 nm to 5 nm and a second peak at from 7 nm to 20 nm, such as from 7 nm to 13 nm or from 10 nm to 20 nm. In embodiments where the shell does not comprise alumina, the second peak may be at from 10 nm to 20 nm. In embodiments where the shell does comprise alumina, the second peak may be at from 7 nm to 13 nm.

The cracking catalyst may have an average pore size of from 2 nm to 10 nm. The average pore size refers to the largest cross-sectional dimension of the pore. For pores having a circular cross section, the average pore size is equal to the average pore diameter. In embodiments, the cracking catalyst may have an average pore size of from 2 nm to 8 nm, from 2 nm to 6.5 nm, from 4 nm to 10 nm, from 4 nm to 8 nm, from 4 nm to 6.5 nm, or any subset thereof. It should be understood that the average pore diameter includes both mesopores formed by the fibers of the shell and micropores present in the ZSM-5 zeolite particles.

The cracking catalyst 202 may have an average particle size of from 100 nanometers (nm) to 5000 nm. The average particle size of the cracking catalyst 202 refers to the largest dimension across the particle averaged over all or a subset of the particles. For the cracking catalyst comprising spherical-shaped particles, the average particle size of the cracking catalyst is equal to the average diameter of the cracking catalyst 202. In embodiments, the cracking catalyst 202 may have an average particle size of from 100 nm to 4000 nm, from 100 nm to 3000 nm, from 100 nm to 1500 nm, from 100 nm to 1000 nm, from 100 nm to 800 nm, from 100 nm to 600 nm, from 200 nm to 5000 nm, from 200 nm to 3000 nm, from 200 nm to 1500 nm, from 200 nm to 1000 nm, from 200 nm to 800 nm, from 200 nm to 600 nm, from 300 nm to 5000 nm, from 300 nm to 3000 nm, from 300 nm to 1500 nm, from 300 nm to 1000 nm, from 300 nm to 800 nm, from 300 nm to 600 nm, from 350 nm to 600 nm, or any subset thereof.

In embodiments, the cracking catalyst 202 may be a nanosphere comprised of a plurality of fibers 212 that are substantially radially oriented within the nanosphere.

The cracking catalyst may comprise less than 0.1 wt. % of metals, other than silicon and aluminum, based on the total weight of the cracking catalyst. In embodiments, the cracking catalyst may comprise less than 0.01 wt. %, less than 0.001 wt. %, or even less than 0.0000001 wt. % of metals, other than silicon and aluminum, based on the total weight of the cracking catalyst. The metals other than silicon and aluminum may include alkali metals, alkaline earth metals, transition metals, lanthanides, precious metals, and actinides. In further embodiments, the metals other than silicon and aluminum may include Ag, Au, Ce, Co, Cu, Fe, Ir, La, Mg, Mn, Mo, Ni, Os, Pd, Pt, Rh, Ru, Sn, Ti, V, Zn, and Zr. The metals other than silicon and aluminum may include the metals in their oxide form, metallic form, or both.

The cracking catalyst of the present disclosure may be formed by a zeolite-seed-assisted micro-emulsion method. Specifically, the zeolite-seed-assisted micro-emulsion method may comprise introducing a silica source into a mixture of a solvent and an alcohol to form a silica precursor solution. The zeolite-seed-assisted micro-emulsion method may further comprise introducing a plurality of zeolite particles into the silica precursor solution to produce a zeolite-silica mixture; stirring the zeolite-silica mixture; preparing a surfactant solution comprising an hydrolyzing agent, a surfactant such as but not limited to cetyltrimethylammonium bromide (CTAB), and water; combining the zeolite-silica mixture and the surfactant solution to form a catalyst precursor mixture; crystallizing the catalyst precursor mixture to form a crystallized solid; and calcining the crystallized solid to form the cracking catalyst.

The silica precursor solution may comprise a silica source, a solvent, and an alcohol. In embodiments, the silica precursor solution may comprise from 1 wt. % to 10 wt. % of the silica source, from 50 wt. % to 75 wt. % of the solvent, and from 10 wt. % to 50 wt. % of the alcohol, on the basis of the total weight of the silica precursor solution. At least 75 wt. %, at least 80 wt. %, at least 85 wt. %, at least 90 wt. %, at least 95 wt. %, at least 99 wt. %, or even at least 99.99 wt. % of the silica precursor solution may comprise the silica source, the solvent, and the alcohol, on the basis of the total weight of the silica precursor solution.

The silica source may be any conventionally known silica precursor, such as tetraethyl orthosilicate (TEOS), tetramethyl orthosilicate (TMOS), sodium silicate ($Na_2SiO_3$), or a combination of these silica sources. In embodiments, the silica source may be TEOS.

The solvent may comprise alkanes, such as but not limited to pentane, hexane, heptane, and octane; aromatics, such as but not limited to toluene, xylene, and benzene; acetic acid; chloroform; diethyl ether; ethyl acetate; methylene chloride; pyridine; or combinations of these solvents. In embodiments, the solvent may be selected from the group consisting of pentane, hexane, heptane, octane, toluene, xylene, benzene, acetic acid, chloroform, diethyl ether, ethyl acetate, methylene chloride, pyridine, and combinations of these solvents. The solvent may be non-polar. In embodiments, the solvent may be toluene.

The alcohol may comprise methanol, ethanol, propanol (such as iso-propanol or n-propanol), butanol, or combinations of these alcohols. In embodiments, the alcohol may be selected from the group consisting of methanol, ethanol, propanol (such as iso-propanol or n-propanol), butanol, and combinations of these alcohols. In embodiments, the alcohol may be 1-butanol.

As discussed above, the zeolite-seed-assisted micro-emulsion method may comprise introducing a plurality of zeolite particles into the silica precursor solution to form a zeolite-silica mixture. The zeolite-silica mixture may have a TEOS to zeolite weight ratio of from 0.1 to 5. In embodiments, the zeolite-silica mixture may have a TEOS to zeolite weight ratio of from 0.1 to 3, from 0.1 to 1, from 0.5 to 5, from 0.5 to 3, from 0.5 to 2, from 0.5 to 1, from 0.65 to 5, from 0.65 to 3, from 0.65 to 1, or any subset thereof. The zeolite-silica mixture may comprise at least 75 wt. %, at least 80 wt. %, at least 85 wt. %, at least 90 wt. %, at least 95 wt. %, at least 99 wt. %, or even at least 99.99 wt. % of the combined weight of silica precursor solution and the plurality of zeolite particles.

The plurality of ZSM-5 zeolite particles may have any of the features or characteristics previously discussed in the present disclosure for the ZSM-5 zeolite particles. The plurality of zeolite particles may comprise ZSM-5 zeolites with a silica to alumina molar ratio of from 1 to 100. In embodiments, ZSM-5 zeolites may have a silica to alumina molar ratio of from 1 to 90, from 1 to 80, from 10 to 100, from 10 to 90, from 10 to 80, from 20 to 100, from 20 to 90, from 20 to 80, from 30 to 100, from 30 to 90, from 30 to 80, from 30 to 60, from 40 to 100, from 40 to 80, from 40 to 60, from 50 to 60, or any subset thereof.

The plurality of zeolite particles may have a microporous pore structure. In embodiments, the plurality of zeolite particles may have an average pore size of less than or equal to 2 nm.

Stirring the zeolite-silica mixture may comprise mechanically agitating the zeolite-silica mixture at a temperature of from 20° C. to 30° C., or about 25° C.

The surfactant solution may comprise a hydrolyzing agent, at least one surfactant (such as but not limited to cetyltrimethylammonium bromide (CTAB)), and water. In embodiments, the surfactant solution may comprise from 0.5 wt. % to 10 wt. % of the hydrolyzing agent, from 1 wt. % to 5 wt. % of the surfactant, and the balance water, based on the total weight of the surfactant solution.

In embodiments, the surfactant solution may further comprise an alumina source. This may be achieved by introducing an alumina source to the surfactant solution. The surfactant solution may comprise from 1 wt. % to 5 wt. % of the hydrolyzing agent, from 1 wt. % to 5 wt. % of the at least one surfactant, from 0.01 wt. % to 1 wt. % of the alumina source, and the balance water, on the basis of the total weight of the surfactant solution.

The hydrolyzing agent may comprise an agent suitable to hydrolyze the silica precursor. In embodiments, the hydrolyzing agent may comprise urea, thiourea, amides, ammonia, hydrazine hydrate, sodium hydroxide, sodium carbonate, sodium bicarbonate, sodium phosphate, potassium hydroxide, potassium carbonate, potassium bicarbonate, and potassium phosphate. In embodiments, the hydrolyzing agent may be urea.

The surfactant solution may include one or more surfactants, such as quarternary ammonium surfactants. Examples of surfactants are cetylpyridinium bromide (CPB), cetyltrimethylammonium bromide (CTAB), or hexadecyltrimethylammonium bromide. In embodiments, the one or more surfactants may comprise, consist of, or consist essentially of cetyltrimethylammonium bromide (CTAB). Without being limited by theory, it is believed that the surfactants may serve to keep zeolite particles separated during the formation of the cracking catalyst. The surfactants may also act as structure directing agents.

Crystallizing the catalyst precursor mixture may comprise heating the catalyst precursor mixture at a temperature of from 150° C. to 200° C. for at least 1 day, such as from 1 day to 5 days, from 2 days to 4 days, or about 3 days. The crystallized solid may then be recovered by filtration or centrifugation.

The crystallized solid may then be calcined to form the cracking catalyst. The calcining may comprise heating the crystallized solid at a calcination temperature of from 500° C. to 800° C., such as from 500° C. to 700° C., from 500° C. to 600° C., from 525° C. to 800° C., from 525 to 650° C., from 525° C. to 575° C., from 550° C. to 800° C., from 550° C. to 575° C., or any subset thereof. Calcining the crystallized solid may comprise heating the crystallized solid at the calcination temperature for a calcination period of from 5 hours to 24 hours in an air atmosphere.

The cracking catalyst may be in its sodium form after calcination. The method of making the cracking catalyst may comprise converting the cracking catalyst to hydrogen form before use. Converting the cracking catalyst to hydrogen form may comprise hydrogen treatment or ion exchange. For example, converting the cracking catalyst to hydrogen form may comprise exposing the cracking catalyst to ammonium nitrate at a temperature of 80° C. for between 4 hours and 5 hours.

Referring again to FIG. 1, the cracked effluent 140 may pass out of the steam catalytic cracking reactor 130. The cracked effluent 140 may include one or more products and intermediates, such as but not limited to light hydrocarbon gases, light olefins, aromatic compounds, pyrolysis oil, or combinations of these. The light olefins in the cracked effluent 140 may include ethylene, propylene, butenes, or combinations of these.

The contacting the hydrocarbon feed with the steam and the cracking catalyst under steam enhanced catalytic cracking conditions may cause the hydrocarbon feed to be converted to other products, such as light olefins ($C_2$ to $C_4$ olefins), $C_6$ to $C_{10}$ aromatic compounds, saturated $C_2$-$C_4$ hydrocarbons, fuel gas, and coke. In embodiments, the contacting the hydrocarbon feed with the steam and the cracking catalyst under steam enhanced catalytic cracking conditions may cause at least 60 wt. %, such as at least 61 wt. %, at least 62 wt. %, at least 63 wt. %, at least 64 wt. %, at least 65 wt. %, at least 66 wt. %, at least 67 wt. %, or even at least 68 wt. % of the hydrocarbon feed to be converted to other products, based on the total weight of the hydrocarbon feed.

The cracked effluent may comprise at least 40 wt. % of light olefins, based on the total weight of the cracked effluent. In embodiments, the cracked effluent may comprise at least 41 wt. %, at least 42 wt. %, at least 43 wt. %, or at least 44 wt. %, from 40 wt. % to 60 wt. %, from 42 wt. % to 60 wt. %, from 44 wt. % to 60 wt. %, from 40 wt. % to 50 wt. %, from 42 wt. % to 50 wt. %, from 44 wt. % to 50 wt. %, from 40 wt. % to 47 wt. %, from 42 wt. % to 47 wt. %, from 44 wt. % to 47 wt. %, or any subset thereof of light olefins, based on the total weight of hydrocarbons in the cracked effluent.

The cracked effluent may comprise ethylene. In embodiments, the cracked effluent may comprise at least 19 wt. % of ethylene, such as at least 20 wt. %, at least 21 wt. %, or at least 22 wt. % of ethylene, from 19 wt. % to 30 wt. %, from 19 wt. % to 27.5 wt. %, from 19 wt. % to 25 wt. %, from 19 wt. % to 24 wt. %, from 20 wt. % to 30 wt. %, from 20 wt. % to 27.5 wt. %, from 20 wt. % to 25 wt. %, from 20 wt. % to 24 wt. %, or any subset thereof based on the total weight of hydrocarbons in the cracked effluent.

The cracked effluent may comprise propylene. In embodiments, the cracked effluent may comprise at least 15 wt. % of propylene, such as at least 16 wt. %, at least 17 wt. %, at least 18 wt. %, or at least 19 wt. % of propylene, from 15 wt. % to 30 wt. %, from 15 wt. % to 25 wt. %, from 15 wt. % to 20 wt. %, from 15 wt. % to 19 wt. %, from 17 wt. % to 30 wt. %, from 17 wt. % to 25 wt. %, from 17. % to 20 wt. %, from 17 wt. % to 19 wt. %, or any subset thereof, based on the total weight of hydrocarbons in the cracked effluent.

The cracked effluent may comprise butenes. In embodiments, the cracked effluent may comprise less than 8 wt. % of butenes, such as less than 7 wt. %, less than 6.8 wt. %, from 0.1 wt. % to 8 wt. %, from 0.1 wt. % to 6.8 wt. %, from 2 wt. % to 8 wt. %, from 2 wt. % to 6.8 wt. %, from 3 wt. % to 8 wt. %, from 3 wt. % to 6.8 wt. %, from 3.5 wt. % to 8 wt. %, from 3.5 wt. % to 6.8 wt. %, or any subset thereof, of butenes, based on the total weight of hydrocarbons in the cracked effluent.

The cracked effluent may comprise $C_6$ to $C_{10}$ aromatic compounds, such as those contained within naphtha. In embodiments, the cracked effluent may comprise at least 15 wt. %, at least 18 wt. %, from 15 wt. % to 40 wt. %, from 15 wt. % to 30 wt. %, from 18 wt. % to 30 wt. %, or any subset thereof, of $C_6$ to $C_{10}$ aromatic compounds, based on the total weight of hydrocarbons in the cracked effluent.

The contacting the hydrocarbon feed with the steam and the cracking catalyst under steam enhanced catalytic cracking conditions may cause some of portion of the hydrocarbon feed to be converted to coke. In embodiments, the contacting the hydrocarbon feed with steam and the cracking catalyst under steam enhanced catalytic cracking conditions may cause less than 7 wt. %, less than 6.2 wt. %, less than 6.1 wt. %, less than 6 wt. %, less than 5.8 wt. %, less than 4.5 wt. %, or even less than 4.5 wt. % of the hydrocarbon feed to be converted to coke, based on the total weight of the hydrocarbon feed.

It should be understood that at least a portion of any coke produced is on the cracking catalyst, such as being adhered to the cracking catalyst. Further, at least a portion of the coke on the cracking catalyst will be removed during the regeneration cycle, such as through combustion of the coke in the regenerator.

Referring again to FIG. 1, the steam catalytic cracking system 110 may further include a cracking effluent separation system 150 disposed downstream of the steam catalytic cracking reactors 130. When the steam catalytic cracking system 110 includes a plurality of steam catalytic cracking reactors 130, the steam catalytic cracking effluents 140 from each of the steam catalytic cracking reactors 130 may be passed to a single shared cracking effluent separation system 150. In embodiments, each steam catalytic cracking reactor 130 may have its own dedicated cracking effluent separation system 130. The steam catalytic cracking effluent 140 may be passed from the steam catalytic cracking reactor 130 directly to the cracking effluent separation system 150. The cracking effluent separation system 150 may separate the steam catalytic cracking effluent 140 into one or more than one cracking product effluents, which may be liquid or gaseous product effluents.

Referring again to FIG. 1, the cracking effluent separation system 150 may include one or a plurality of separation units. Separation units may include but are not limited to distillation columns, fractionators, flash drums, knock-out drums, knock-out pots, centrifuges, decanters, filtration devices, traps, scrubbers, expansion devices, membranes, solvent extraction devices, adsorption devices, chemical separators, crystallizers, chromatographs, precipitators, evaporators, driers, high-pressure separators, low-pressure separators, or combinations or these. The separation units may include one or more gas-liquid separators, one or more liquid-liquid separators, or a combination of these.

In embodiments, the cracking effluent separation system 150 may include a gas-liquid separation unit 160 and a centrifuge unit 170 downstream of the gas-liquid separation unit 160. The gas-liquid separation unit 160 may operate to separate the steam catalytic cracking effluent 140 into a liquid effluent 162 and a gaseous effluent 164. The gas-liquid separation unit 160 may operate to reduce the temperature of the steam catalytic cracking effluent 140 to condense constituents of the steam catalytic cracking effluent 140 having greater than or equal to 5 carbon atoms. The gas-liquid separation unit 160 may operate at a temperature of from 10° C. to 15° C. to ensure that normal pentane and constituents with boiling point temperatures greater than normal pentane are condensed into the liquid effluent 162. The liquid effluent 162 may include distillation fractions such as naphtha, kerosene, gas oil, vacuum gas oil; unconverted feedstock; residue; water; or combinations of these. The liquid effluent 162 may include the light aromatic compounds produced in the steam catalytic cracking reactor 130, which light aromatic compounds may include but are not limited to benzene, toluene, mixed xylenes, ethylbenzene, and other light aromatic compounds. The liquid effluent 162 may include at least 95%, at least 98%, at least 99%, or even at least 99.5% of the hydrocarbon constituents of the steam catalytic cracking effluent 140 having greater than or equal to 5 carbon atoms. The liquid effluent 162 may include at least 95%, at least 98%, at least 99%, or even at least 99.5% of the water from of the steam catalytic cracking effluent 140.

The gaseous effluent 164 may include olefins, such as ethylene, propylene, butenes, or combinations of these; light hydrocarbon gases, such as methane, ethane, propane, n-butane, i-butane, or combinations of these; other gases, such as but not limited to hydrogen; or combinations of these. The gaseous effluent 164 may include the $C_2$-$C_4$ olefin products, such as but not limited to, ethylene, propylene, butenes (1-butene, cis-2-butene, trans-2-butene, isobutene, or combinations of these), or combinations of these, produced in the steam catalytic cracking reactor 130. The gaseous effluent 164 may include at least 90%, at least 95%, at least 98%, at least 99%, or at least 99.5% of the $C_2$-$C_4$ olefins from the steam catalytic cracking effluent 140. The gaseous effluent 164 may be passed to a downstream gas separation system (not shown) for further separation of the gaseous effluent 164 into various product streams, such as but not limited to one or more olefin product streams.

In embodiments, the liquid effluent 162, which includes the water and hydrocarbon having greater than 5 carbon atoms, may be passed to the in-line centrifuge unit 170. The in-line centrifuge unit 170 may operate to separate the liquid effluent 162 into a liquid hydrocarbon effluent 172 and an aqueous effluent 174. The in-line centrifuge unit 170 may be operated at a rotational speed of from 2500 rpm to 5000 rpm, from 2500 rpm to 4500 rpm, from 2500 rpm to 4000 rpm, from 3000 rpm to 5000 rpm, from 3000 rpm to 4500 rpm, or from 3000 rpm to 4000 rpm to separate the hydrocarbon phase from the aqueous phase.

The liquid hydrocarbon effluent 172 may include hydrocarbons from the steam catalytic cracking effluent 140 having greater than or equal to 5 carbon atoms. The liquid hydrocarbon effluent 172 may include the light aromatic compounds produced in the steam catalytic cracking reactor 130, which light aromatic compounds may include but are not limited to benzene, toluene, mixed xylenes, ethylbenzene, and other light aromatic compounds. The liquid hydrocarbon effluent 172 may further include naphtha, kerosene, diesel, vacuum gas oil (VGO), or combinations of these. The liquid hydrocarbon effluent 172 may include at 90%, at least 95%, at least 98%, at least 99%, or even at least 99.5% of the hydrocarbon constituents from the liquid effluent 162. The liquid hydrocarbon effluent 172 may be passed to a downstream treatment processes for further conversion or separation. At least a portion of the liquid hydrocarbon effluent 172 may be passed back to the steam catalytic cracking reactor 130 for further conversion to olefins. The aqueous effluent 174 may include water and water soluble constituents from the liquid effluent 162. The aqueous effluent 174 may include some dissolved hydrocarbons soluble in the aqueous phase of the liquid effluent 162. The aqueous effluent 174 may include at least 95%, at least 98%, at least 99%, or even at least 99.5% of the water from the liquid effluent 162. The aqueous effluent 174 may be passed to one or more downstream processes for further treatment. In embodiments, at least a portion of the aqueous effluent 174 may be passed back to the steam catalytic cracking reactor 130 as at least a portion of the water 120 introduced to the steam catalytic cracking reactor 130.

In embodiments, the cracking catalysts of the present disclosure may be used as at least a portion of an FCC catalyst composition for a fluidized catalytic cracking (FCC) reactor. The FCC reactor may be a fluidized bed reactor. In the FCC reactor, the cracking catalyst may be contacted with the hydrocarbon feed, such as crude oil, in the presence of steam to produce light olefins, light aromatic compounds, or combinations of these. Suitable FCC processes for catalytically cracking crude oil in the presence of steam are disclosed in U.S. patent application Ser. No. 17/009,008, U.S. patent application Ser. No. 17/009,012, U.S. patent application Ser. No. 17/009,020, U.S. patent application Ser. No. 17/009,022, U.S. patent application Ser. No. 17/009,039, U.S. patent application Ser. No. 17/009,048, and U.S. patent application Ser. No. 17/009,073, all of which are incorporated by reference in their entireties in the present disclosure. The hydrocarbon feed can be any of the hydrocarbon feeds previously discussed in the present disclosure. The FCC reactor may be an upflow or a downflow FCC reactor. The FCC reactor system can include one or a plurality of FCC reactors, with one or a plurality of catalyst regenerators.

In embodiments, the FCC reactor may be operated at a reaction temperature of at least about 500° C., such as a reaction temperature of from 500° C. to 800° C., from 550° C. to 800° C., from 600° C. to 800° C., from 650° C. to 800° C., from 500° C. to 750° C., from 550° C. to 750° C., from 600° C. to 750° C., from 650° C. to 750° C., from 500° C. to 700° C., from 550° C. to 700° C., from 600° C. to 700° C., or from 650° C. to 700° C. Steam may be injected to the FCC reactor. The hydrocarbon feed may be catalytically cracked in the presence of the steam with the cracking catalyst. The steam to the hydrocarbon mass ratio in the FCC reactor may be from 0.2 to 0.8, from 0.3 to 0.8, from 0.4 to 0.8, from 0.5 to 0.8, from 0.2 to 0.7, from 0.3 to 0.7, from 0.4 to 0.7, from 0.5 to 0.7, from 0.2 to 0.6, from 0.3 to 0.6, from 0.4 to 0.6, or from 0.5 to 0.6. Steam may refer to all water in the FCC reactor. In embodiments, the residence time of the hydrocarbon feed and the steam in contact with the cracking catalyst in the FCC reactor may be from 1 second to 20 seconds, from 2 seconds to 20 seconds, from 5 seconds to 20 seconds, from 8 seconds to 20 seconds, from 1 second to 18 seconds, from 2 seconds to 18 seconds, from 5 seconds to 18 seconds, from 8 seconds to 18 seconds, from 1 second to 16 seconds, from 2 seconds to 16 seconds, from 5 seconds to 16 seconds, from 8 seconds to 16 seconds, from 1 second to 14 seconds, from 2 seconds to 14 seconds, from 5 seconds to 14 seconds, from 8 seconds to 14 seconds, from 1 second to 12 seconds, from 2 seconds to 12 seconds, from 5 seconds to 12 seconds, or from 8 seconds to 12 seconds. In embodiments, the cracking catalyst to hydrocarbon (catalyst to oil) weight ratio in the FCC reactor may be from 3 to 40, such as from 3 to 30, from 3 to 20, from 5 to 40, from 5 to 30, from 5 to 20, from 5 to 10, from 7 to 40, from 7 to 30, 7 to 20, from 7 to 10, from 10 to 40, from 10 to 30, from 10 to 20, or from 20 to 40. The cracking effluent from the FCC reactor can be separated into various product streams, intermediate streams, and an aqueous stream in a separation system downstream of the FCC reactor.

According to a first aspect of the present disclosure, a process for converting a hydrocarbon feed may comprise contacting a hydrocarbon feed with steam in the presence of a cracking catalyst under steam enhanced catalytic cracking conditions. The contacting the hydrocarbon feed with the steam in the presence of the cracking catalyst may cause at least a portion of the hydrocarbon feed to undergo steam catalytic cracking reactions to produce a cracked effluent. The cracked effluent may comprise $C_2$ to $C_4$ olefins, $C_6$ to $C_{10}$ aromatic compounds, or both. The cracking catalyst may be a nanoparticle comprising: a core and a shell. The core may comprise one or more ZSM-5 zeolite particles and have an outer surface. The shell may comprise a plurality of fibers extending radially outward from the outer surface of the core. The plurality of fibers may comprise silica.

According to a second aspect, in conjunction with the first aspect, the plurality of fibers may further comprise alumina.

According to a third aspect, in conjunction with the first or second aspect, the one or more ZSM-5 zeolite particles may have a molar ratio of silica to alumina of from 30 to 80.

According to a fourth aspect, in conjunction with any one of aspects 1-3, the cracking catalyst may have an average diameter of from 300 nanometers (nm) to 600 nm.

According to a fifth aspect, in conjunction with any one of aspects 1-4, the cracking catalyst may comprise less than 0.1 wt. % of metals other than silicon and aluminum, based on the total weight of the cracking catalyst.

According to a sixth aspect, in conjunction with any one of aspects 1-5, the cracking catalyst may be formed by a zeolite-seed-assisted micro-emulsion method.

According to a seventh aspect, in conjunction with any one of aspects 1-6, the cracking catalyst may consist of or consist essentially of the core and the shell. The core may consist of or consist essentially of the one or more ZSM-5 zeolite particles, the silica, and optionally alumina. The shell may consist of or consist essentially of the plurality of fibers extending radially outward from the core of the particles of the cracking catalyst. The plurality of fibers may consist of or consist essentially of the silica, and, optionally, alumina.

According to an eighth aspect, in conjunction with any one of aspects 1-7, the cracking catalyst may have a bimodal pore size distribution with a first peak at from 2 to 5 nm and a second peak at from 7 to 20 nm.

According to a ninth aspect, in conjunction with any one of aspects 1-8, the cracking catalyst may have a bimodal pore size distribution with a first peak at from 2 to 5 nm and a second peak at from 7 nm to 13 nm.

According to a tenth aspect, in conjunction with any one of aspects 1-9, the shell may comprise alumina and the cracking catalyst may have a bimodal pore size distribution with a first peak at from 2 to 5 nm and a second peak at from 7 nm to 13 nm.

According to an eleventh aspect, in conjunction with any one of aspects 1-10, the cracking catalyst may have a bimodal pore size distribution with a first peak at from 2 to 5 nm and a second peak at from 10 to 20 nm.

According to a twelfth aspect, in conjunction with any one of aspects 1-11, the cracking catalyst may be further defined as a nanosphere comprised of a plurality of fibers that are substantially radially oriented within the nanosphere.

According to a thirteenth aspect, in conjunction with any one of aspects 1-12, the contacting may further comprise contacting the hydrocarbon feed with the steam in the presence of the cracking catalyst at a weighted average bed temperature (WABT) of from 100° C. to 700° C., a steam to hydrocarbon feed mass ratio of from 0.2 to 0.8, or both.

According to a fourteenth aspect, in conjunction with any one of aspects 1-13, the contacting may further comprise contacting the hydrocarbon feed with the steam in the presence of the cracking catalyst in a fluidized bed reactor, a fixed bed reactor, multiple-fixed bed reactors, a batch reactor, a fluid catalytic cracking (FCC) reactor, a moving bed catalytic cracking reactor, or combinations thereof.

According to a fifteenth aspect, in conjunction with any one of aspects 1-14, the hydrocarbon feed may be a whole crude.

According to a sixteenth aspect, in conjunction with any one of aspects 1-15, where the hydrocarbon feed may be a whole crude with an API gravity of from 25 to 52 and a sulfur content of from 0.05 to 3 wt. %.

According to a seventeenth aspect, in conjunction with any one of aspects 1-16, the contacting the hydrocarbon feed with the steam and the cracking catalyst under steam enhanced catalytic cracking conditions may cause less than 6 wt. % of the hydrocarbon feed to be converted to coke, based on the total weight of the hydrocarbon feed.

According to an eighteenth aspect, in conjunction with any one of aspects 1-17, the contacting the hydrocarbon feed with the steam and the cracking catalyst under steam enhanced catalytic cracking conditions may cause at least 60 wt. % of the hydrocarbon feed to be converted to other products.

According to a nineteenth aspect, in conjunction with any one of aspects 1-18, the cracked effluent may comprise $C_2$ to $C_4$ olefins.

According to a twentieth aspect, in conjunction with any one of aspects 1-19, the $C_2$ to $C_4$ olefins may comprise ethylene, propylene, or both.

According to a twenty-first aspect, in conjunction with the twentieth aspect, the cracked effluent may comprise at least 40 wt. % of $C_2$ to $C_4$ olefins.

According to a twenty-second aspect, in conjunction with any one of aspects 1-21, the cracking catalyst may have an average diameter of from 300 nanometers (nm) to 600 nm; the one or more ZSM-5 zeolite particles may have a molar ratio of silica to alumina of from 30 to 80; the cracking catalyst may comprise less than 0.1 wt. % of metals, other than silicon and aluminum, based on the total weight of the cracking catalyst; the cracking conditions may comprise a weighted average bed temperature (WABT) of from 100° C. to 700° C. and a steam to hydrocarbon feed mass ratio of from 0.2 to 0.8; the hydrocarbon feed may comprise a whole crude with an API gravity of from 25 to 52; the cracked effluent may comprise at least 40 wt. % of $C_2$ to $C_4$ olefins; and the $C_2$ to $C_4$ olefins may comprise ethylene, propylene, or both.

According to a twenty-second aspect, in conjunction with any one of aspects 1-22, the cracking catalyst may be formed by a process comprising: preparing a silica precursor solution which may comprise a silica source dispersed in a mixture of a solvent and an alcohol; combining a plurality of zeolite particles into the silica precursor solution to produce a zeolite-silica mixture; stirring the zeolite-silica mixture; preparing a surfactant solution which may comprise a hydrolyzing agent, cetyltrimethylammonium bromide (CTAB), and water; combining the zeolite-silica mixture and the surfactant solution to form a catalyst precursor mixture; crystallizing the catalyst precursor mixture to form a crystallized solid; and calcining the crystallized solid to form the cracking catalyst. The cracking catalyst may comprise the core and the shell. The core may comprise the one or more ZSM-5 zeolite particles and have the outer surface, and the shell may comprise the plurality of fibers extending radially outward from the outer surface of the core.

According to a twenty-fourth aspect, in conjunction with aspect 23, the process may further comprise introducing an alumina source to the surfactant solution.

According to a twenty-fifth aspect, in conjunction with either of aspects 23 or 24, the calcining may comprise heating the crystallized solid at a temperature of from 525° C. to 575° C.

According to a twenty-sixth aspect, in conjunction with any one of aspects 23-25, the crystallizing the catalyst precursor mixture may further comprise heating the catalyst precursor mixture at a temperature of from 150° C. to 200° C.

According to a twenty-seventh aspect, in conjunction with any one of aspects 23-26, the process may further comprise converting the cracking catalyst to hydrogen form.

EXAMPLES

The various aspects of the present disclosure will be further clarified by the following examples. The examples are illustrative in nature and should not be understood to limit the subject matter of the present disclosure.

Examples 1-3: Preparation of Cracking Catalyst

In Examples 1-3, the cracking catalysts of the present disclosure having different compositions as is shown in Table 3 were prepared.

A micro-emulsion system formed from the combination of a surfactant (CTAB), a solvent (toluene), water, and an alcohol (1-butanol) coupled with zeolite crystal seed particles (CBV3024E, CBV8014, Zeolyst International) were used to prepare fibrous silica and silica-alumina ZSM-5 (FS-ZSM-5).

In Examples 1 and 2, 4.25 g (0.02 moles) of tetraethyl orthosilicate (TEOS) was dissolved in a mixture of 51.6 g (0.56 moles) of toluene and 2.4 g (0.032 moles) of 1-butanol to form a silica precursor solution. Then, ZSM-5 zeolite particles (5.0 g), which had a silica to alumina molar ratio of 80 (Example 1) and 30 (Example 2), were added to the solution and stirred for 30 minutes at 25° C. to produce a zeolite-silica mixture. The ZSM-5 zeolite particles used were CBV 8014 (SAR of 80) and CBV3024E (SAR of 30), both from Zeolyst international. A surfactant solution of 1.08 g (0.018 moles) of urea, 1.97 g (0.0054 moles) of cetyltrimethylammonium bromide (CTAB), and 30 mL of distilled water was prepared and then added to the zeolite-silica mixture. The resulting solution was crystallized in a Teflon-lined autoclave at 170° C. for 3 days. The crystallized solid phase was recovered by filtration, which was extensively washed with distilled water (0.5 L) and dried overnight at 90° C. The dried product was calcined in air at 550° C. for 8 hours (reaching the calcination temperature at 1° C. min$^{-1}$). The calcined solid was in sodium form. The sodium form of the calcined solid was converted to its hydrogen form via three successive exchanges with 1.0 M NH$_4$NO$_3$ solution (4.5 hours stirring at 80° C.), followed by calcination in static air (550° C. for 5 hours).

For Example 3, 4.25 g (0.02 moles) of tetra-ethyl orthosilicate (TEOS) was dissolved in a mixture of 51.6 g of toluene and 2.4 g of 1-butanol to form the silica precursor solution. Then, the ZSM-5 zeolite particles (5.0 g), which had a silica to alumina molar ratio of 30, was added to the solution and stirred for 30 min to produce the zeolite-silica mixture. The ZSM-5 zeolite particles used were CBV3024E from Zeolyst international. A surfactant solution of Al$_2$(SO$_4$)$_3$·18H$_2$O (0.44 g), urea (1.08 g), CTAB (1.97 g), and distilled water (36.0 g) was then prepared and added to the zeolite-silica mixture. The resulting solution was crystallized in a Teflon-lined autoclave at 170° C. for 3 days. The crystallized solid phase was recovered by filtration, which was extensively washed with distilled water (0.5 L) and dried overnight at 90° C. The dried product was calcined in air at 550° C. for 8 hours (1° C./min). The calcined solid was in sodium form. The sodium form of the calcined solid was converted to its hydrogen form via three successive exchanges with 1.0 M NH$_4$NO$_3$ solution (4.5 hours stirring at 80° C.), followed by calcination in static air (550° C. for 5 h).

TABLE 3

| Example | ZSM-5 Zeolite Silica/Alumina Ratio | TEOS/Zeolite Weight Ratio | TEOS/Al$_2$(SO$_4$)$_3$·18H$_2$O Molar Ratio |
|---|---|---|---|
| 1 | 80 | 0.85 | N/A |
| 2 | 30 | 0.85 | N/A |
| 3 | 30 | 0.85 | 15.86 |

Comparative Examples 4-5

For Comparative Examples 4 and 5, comparative cracking catalysts were provided to be compared against the cracking catalysts of Examples 1-3. Comparative Example 4 (CE. 4) was a commercially-available ZSM-5 zeolite with a silica to alumina molar ratio of 80. Specifically, CE. 4 was CBV 8014 ZSM-5 zeolite from Zeolyst International. Comparative Example 5 (CE. 5) was a commercially-available ZSM-5 zeolite with a silica to alumina molar ratio of 30. Commercially-available CE. 5 was CBV 3024E, also from Zeolyst International.

Catalyst Characterization

Figure 3:
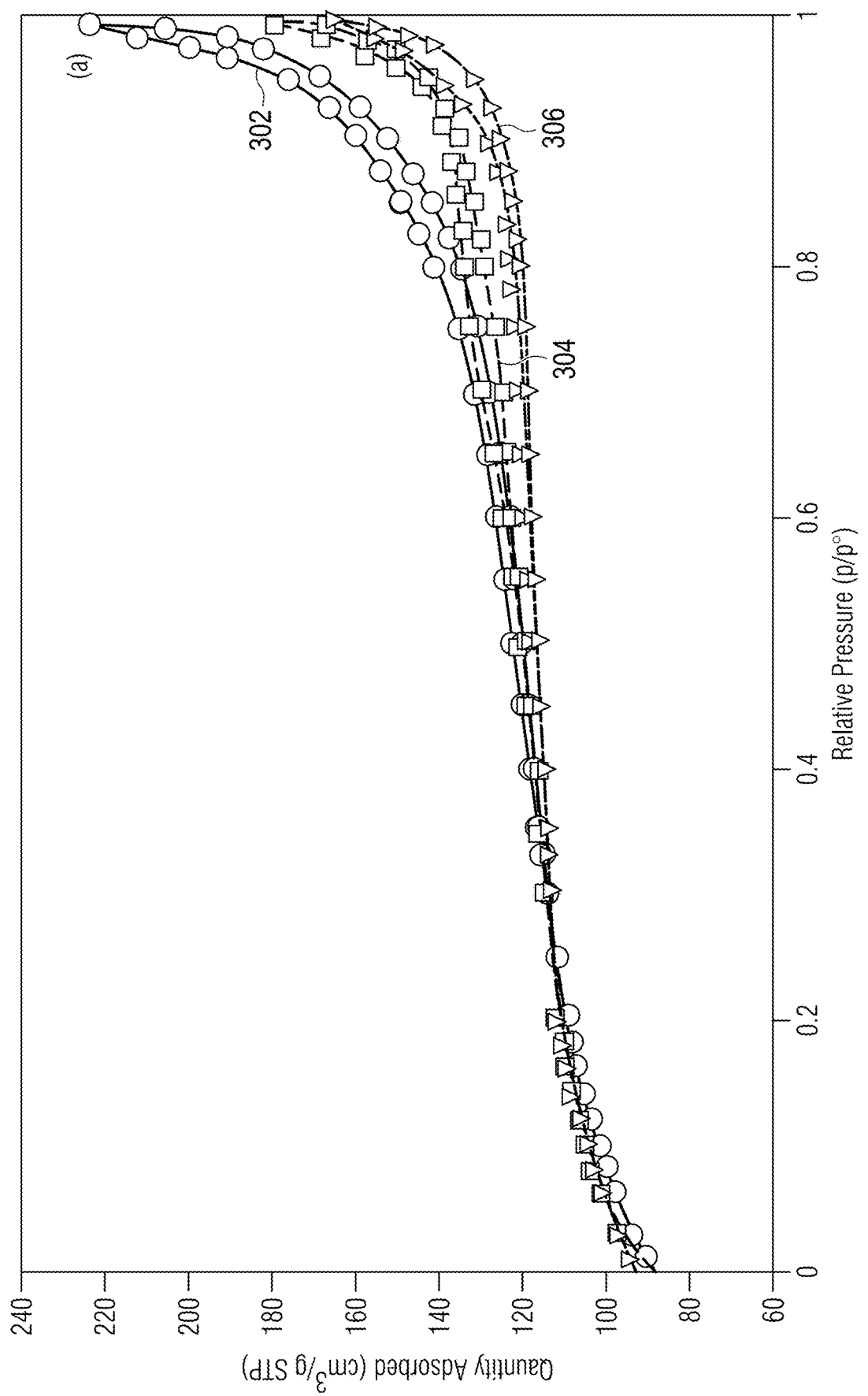
FIG. 3 graphically depicts $N_2$ adsorption isotherm for cracking catalysts, according to one or more embodiments shown and described in the present disclosure.

Referring now to FIG. 3, N$_2$ adsorption-desorption isotherms were performed on each of CE. 5 (302), Example 2 (304), and Example 3 (306). The comparative cracking catalyst of CE. 5 (302) exhibited typical isotherms for microporous materials. Meanwhile, the cracking catalysts of Example 2 (304) and Example 3 (306) showed typical type IV isotherms with H$_3$ hysteresis, showing a mesoporous material with non-uniform slit-shaped pores. The cracking catalysts of Example 2 (304) and Example 3 (306) demonstrated greater nitrogen uptake compared to the comparative cracking catalyst CE. 5 (302), indicating that the catalysts of the present disclosure have greater porosity than commercially-available ZSM-5 zeolites. At high relative pressures, a sharp increase in nitrogen uptake due to the presence of inter-particle pores was observed only in the cracking catalysts of Examples 2 and 3.

Figure 4:
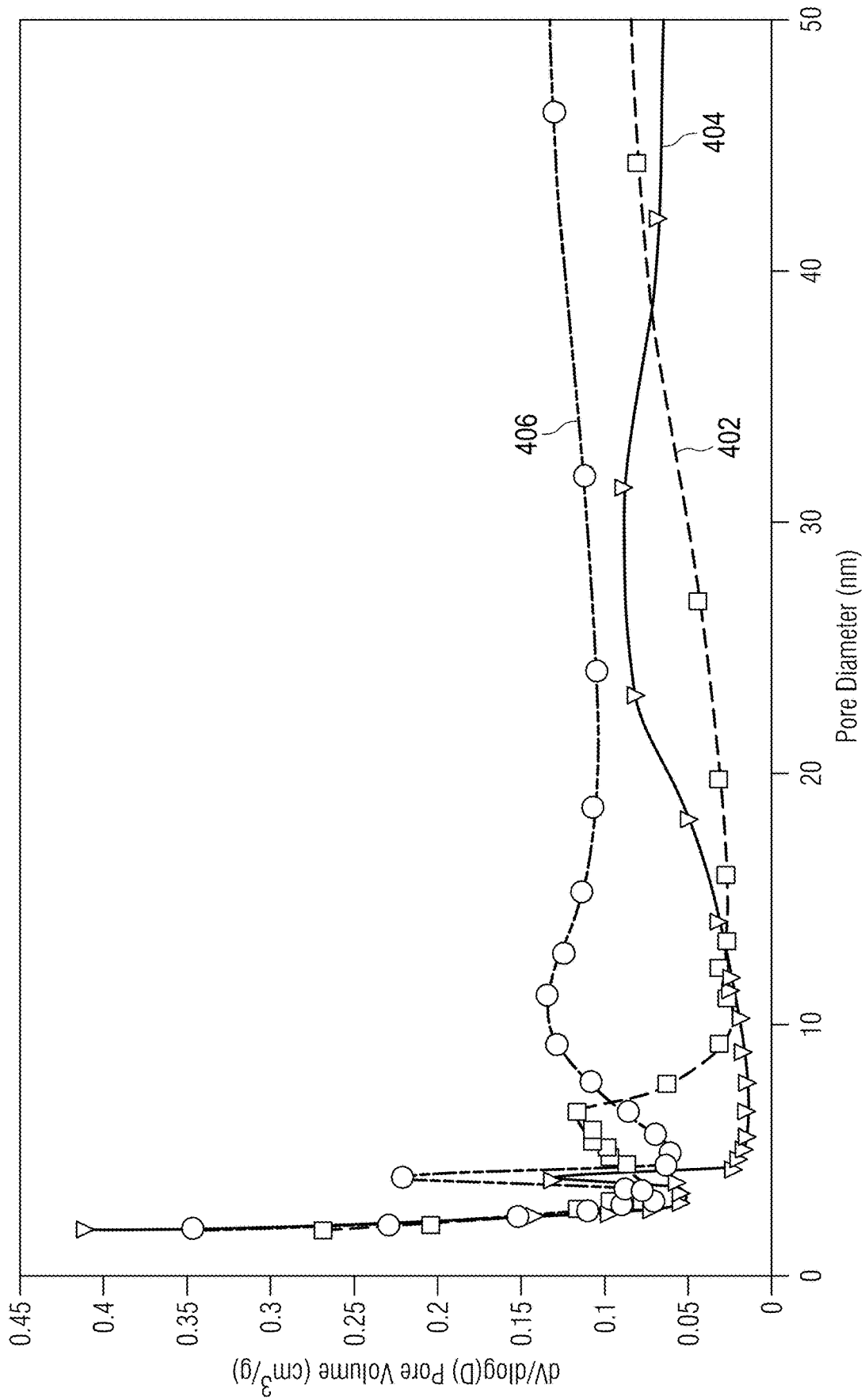
FIG. 4 graphically depicts a calculated pore diameter distribution comprising pore volume (y-axis) as a function of pore diameter (x-axis) for cracking catalysts, according to one or more embodiments shown and described in the present disclosure.

Referring now to FIG. 4, the Barrett-Joyner-Halenda (BJH) method was used to calculate pore size distributions from nitrogen absorption isotherms. The pore size distributions of the cracking catalyst of Example 2 (404) and Example 3 (402) showed a sharp peak at 3.8 nm and broad peaks in the range of 20-40 nm in Example 2 (404) and 7-13 nm in Example 3 (406). The narrow peaks are believed to correspond to the mesopores from the self-assembly of the CTAB surfactant and the broad peaks are believed to correspond to inter-dendrimer distances. The microporous ZSM-5 zeolite of CE. 5 (402) did not show peaks at either location.

Brunauer-Emmett-Teller (BET) surface area and other textural properties were calculated from the nitrogen absorption isotherms. These properties are summarized in Table 4. As can be seen in Table 4, surprisingly, BET surface area remains unchanged and the pore volume of the cracking catalyst of Example 2 increased, relative to the comparative cracking catalyst CE. 5.

TABLE 4

| Catalyst | $S_{BET}$ (m²/g) | $S_{meso}$ (m²/g) | $V_{total}$ (cm³/g) | $V_{micro}$ (cm³/g) | $V_{meso}$ (cm³/g) | $V_{meso}/V_{micro}$ | PD (nm) | $SiO_2/Al_2O_3$ |
|---|---|---|---|---|---|---|---|---|
| CE. 5 | 342 | 133 | 0.170 | 0.112 | 0.058 | 0.518 | 5.05 | 31.2 |
| Ex. 2 | 342 | 145 | 0.143 | 0.106 | 0.037 | 0.349 | 4.26 | 54 |
| Ex. 3 | 344 | 161 | 0.252 | 0.099 | 0.153 | 1.55 | 6.19 | 45 |

The cracking catalyst of Example 2 also showed a significant increase in the overall silica to alumina molar ratio relative to the ZSM-5 zeolite of CE. 5. This was attributed to the presence of the dendrimeric silica fibers and the decrease in the alumina species, relative to the pristine catalyst (CE. 5).

Figure 5:
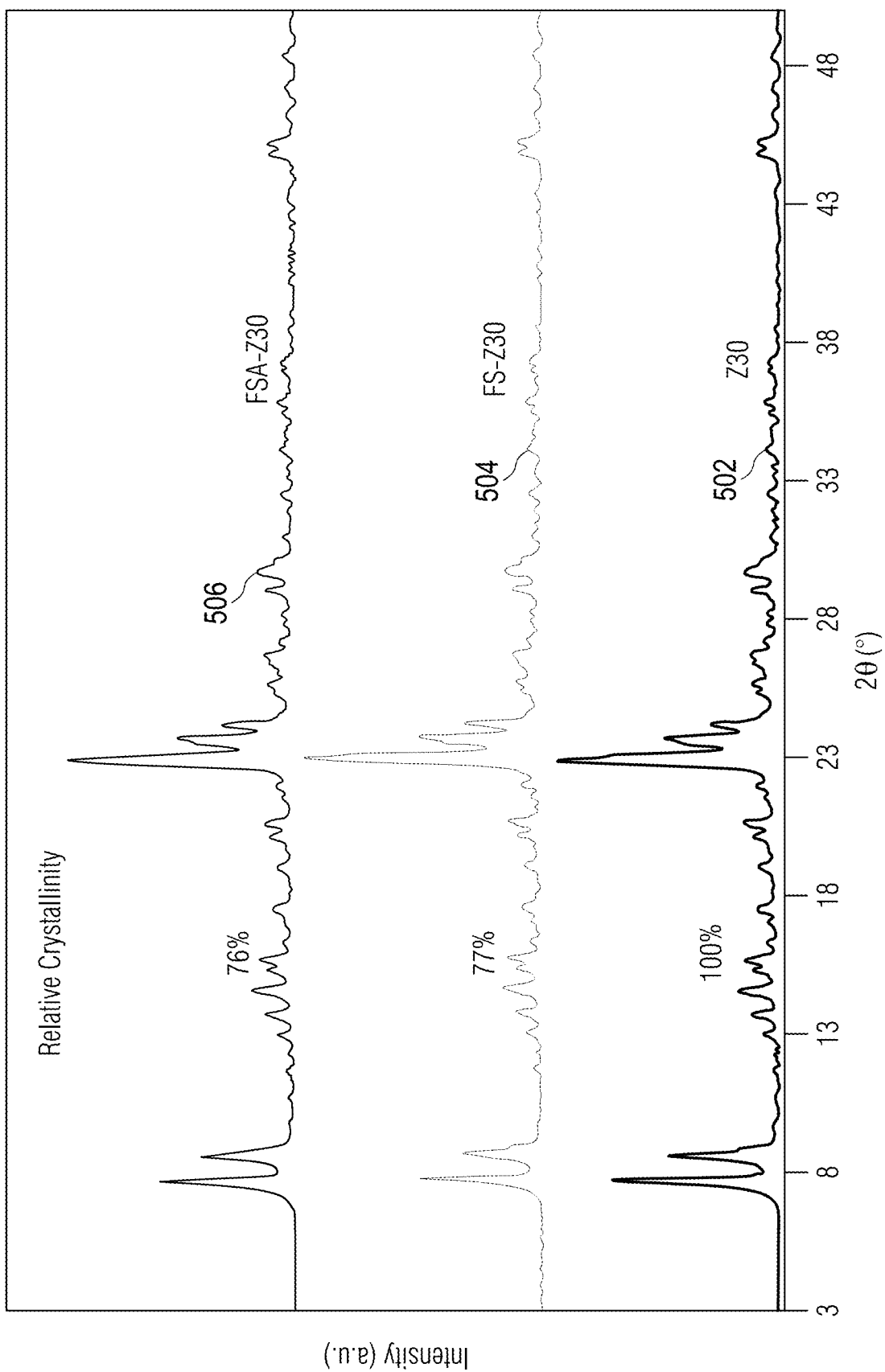
FIG. 5 graphically depicts X-ray diffraction (XRD) spectra for cracking catalysts, according to one or more embodiments shown and described in the present disclosure.

Referring now to FIG. 5, X-ray diffraction (XRD) tests were conducted on the catalysts of CE. 5 (502), Example 2 (504), and Example 3 (506). The cracking catalysts of Example 2 (504) and Example 3 (506) showed the characteristic pattern of an MFI structure at 2θ=7-10° and 2θ-24°, with crystallinity of 77% and 76% respectively. Furthermore, both the modified catalysts possessed lower crystallinity than the commercially available ZSM-5 catalyst CE. 5 (502) (100%) due to the formation of dendrimeric silica fibers on the ZSM-5 in the cracking catalysts of Examples 2 and 3.

Figure 6:
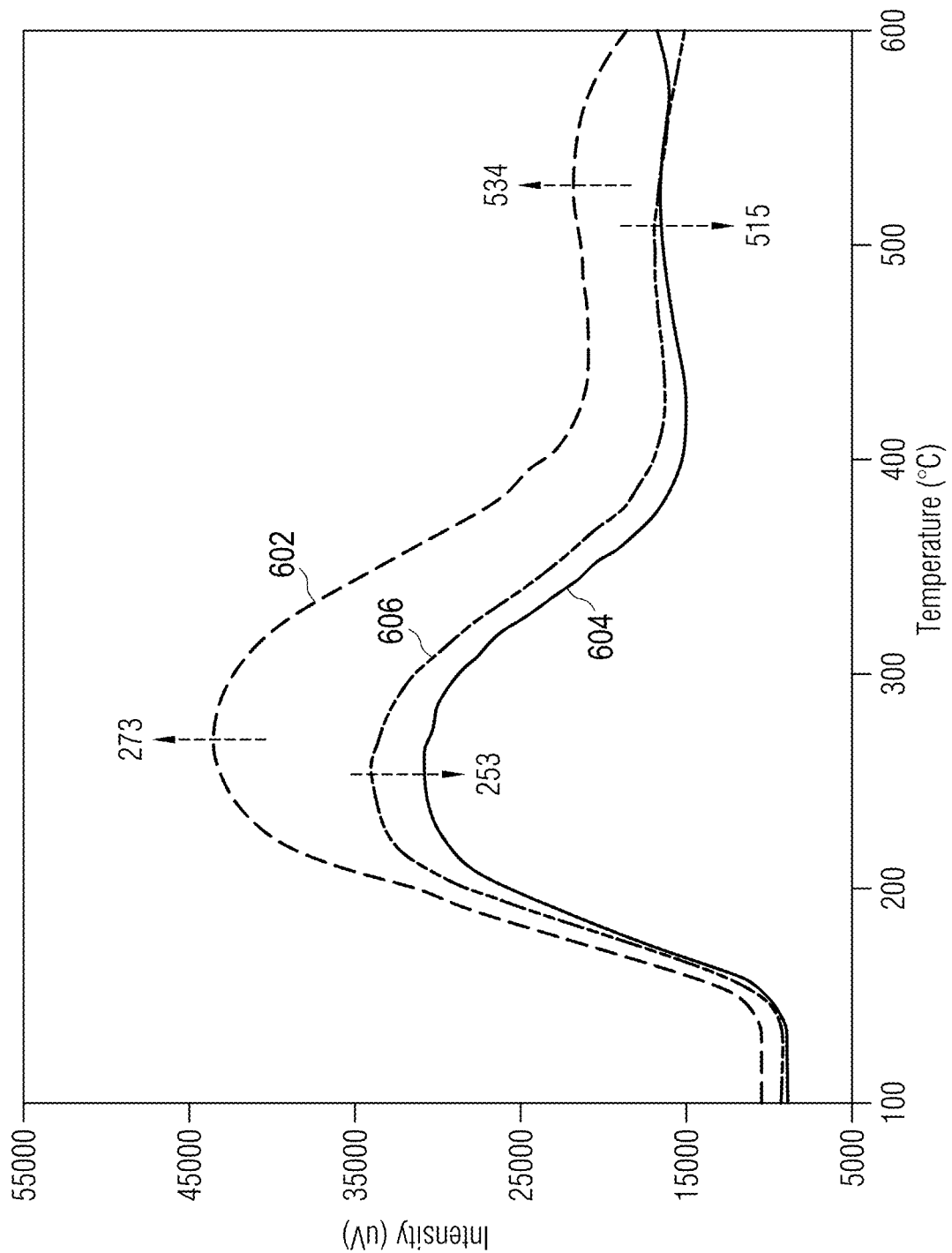
FIG. 6 graphically depicts ammonia temperature programmed desorption ($NH_3$-TPD) curves for cracking catalysts, according to one or more embodiments shown and described in the present disclosure.

Referring now to FIG. 6 and Table 5, ammonia temperature-programmed desorption ($NH_3$-TPD) was conducted on the catalysts of (602), Example 2 (604), and Example 3 (606). The $NH_3$-TPD profiles of commercially available catalyst CE. 5 (602) show two clear peaks at around 273° C. and 534° C., which correspond to the weak and strong acid sites respectively. Two peaks at around 253° C. and 515° C. are observed in the $NH_3$-TPD profiles of cracking catalysts Example 2 (604) and Example 3 (606), which shows left-shifts of approximately 20° C. and 24° C., relative to those of commercially available catalyst CE. 5 (602). The total acidity quantity of the cracking catalysts Example 2 (604) was 0.181 mmol/g and of Example 3 (606) was 0.219 mmol/g, which was approximately 57-68% of that of commercially available catalyst CE. 5 (602) (0.318 mmol/g). The slightly lower temperatures and smaller acidity for the modified composite are believed to be related to the sacrificed inter-surface acidity due to the coverage of Al-containing mesoporous silica shells on ZSM-5 cores.

TABLE 5

| | Amount $NH_3$ desorbed (mmol/g) | | |
|---|---|---|---|
| Catalyst | I 100-350° C. | II Above 350° C. | Total |
| CE. 5 | 0.280 | 0.038 | 0.318 |
| Ex. 2 | 0.167 | 0.014 | 0.181 |
| Ex. 3 | 0.188 | 0.031 | 0.219 |

Figure 7:
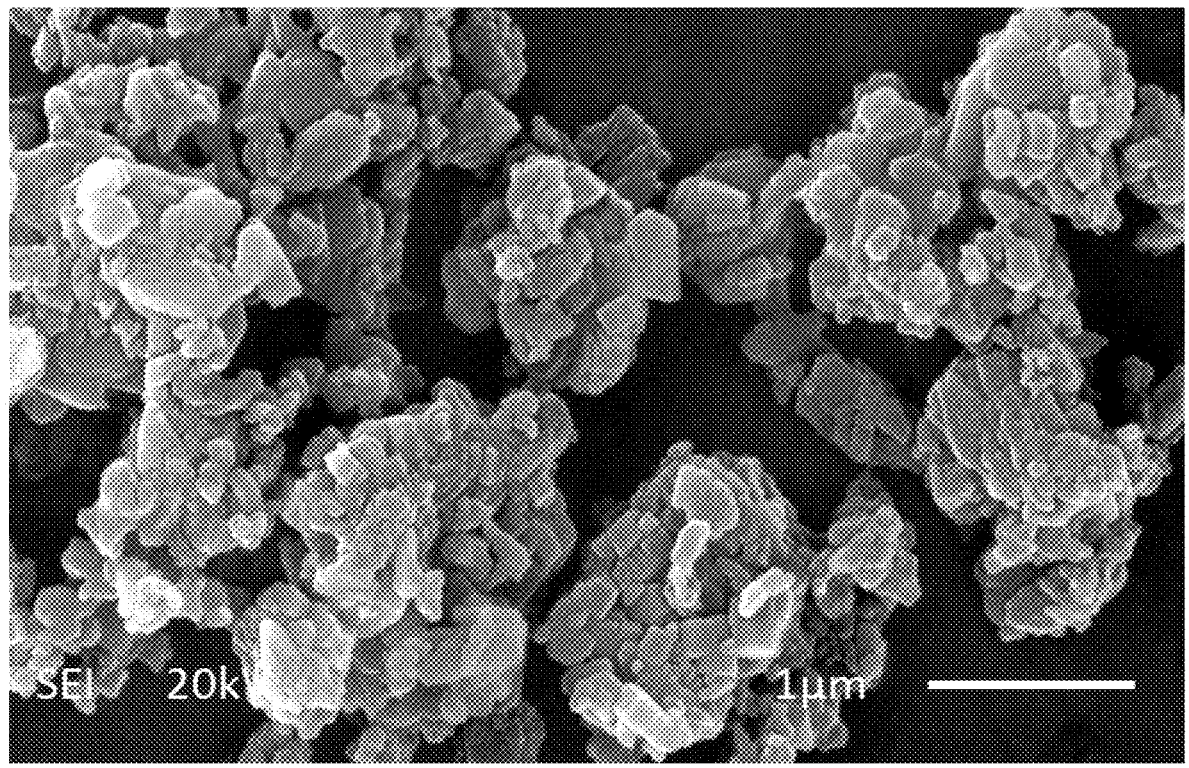
FIG. 7 is a scanning electron microscope (SEM) image of a comparative cracking catalyst.
Figure 8:
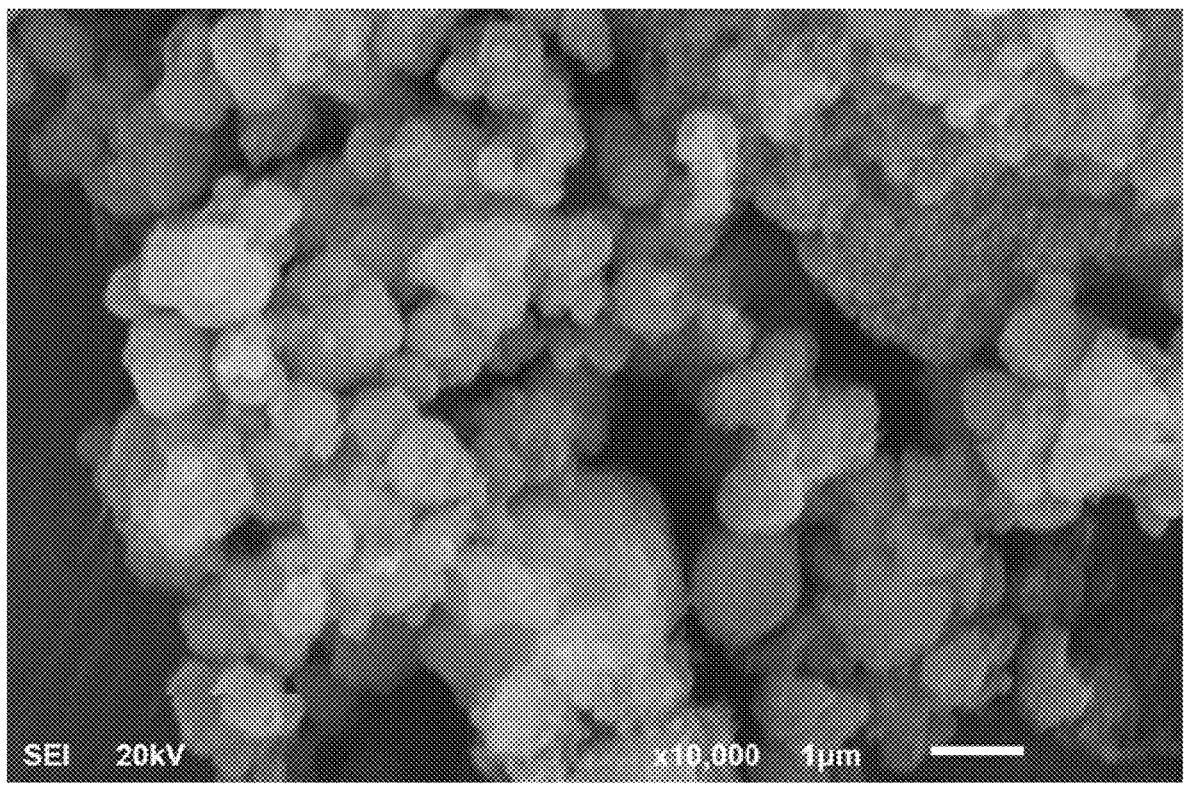
FIG. 8 is an SEM image of a cracking catalyst, according to one or more embodiments shown and described in the present disclosure.

Scanning electron microscope (SEM) images were obtained for commercially available catalyst CE. 5 and cracking catalyst Example 2, and are shown as FIG. 7 and FIG. 8 respectively. Commercially available catalyst CE. 5 possesses well-ordered sharp-edges and square—looking crystallite morphology with a large crystal size of approximately 150 nm. Cracking catalyst Example 2 possesses a similar morphology. However, Example 2 was slightly deformed from square to spherical particles of sizes in the range of 350 nm to 600 nm.

Catalyst Evaluation

The cracking catalysts were evaluated at atmospheric pressure in a steam fixed-bed reaction (FBR) system for the cracking of light crude oil. In particular, an Arabian Extra Light (AXL) crude oil as described in Table 2 was used. The cracked gaseous and liquid products were characterized by off-line gas chromatographic (GC) analysis using simulated distillation and naphtha analysis techniques.

Figure 9:
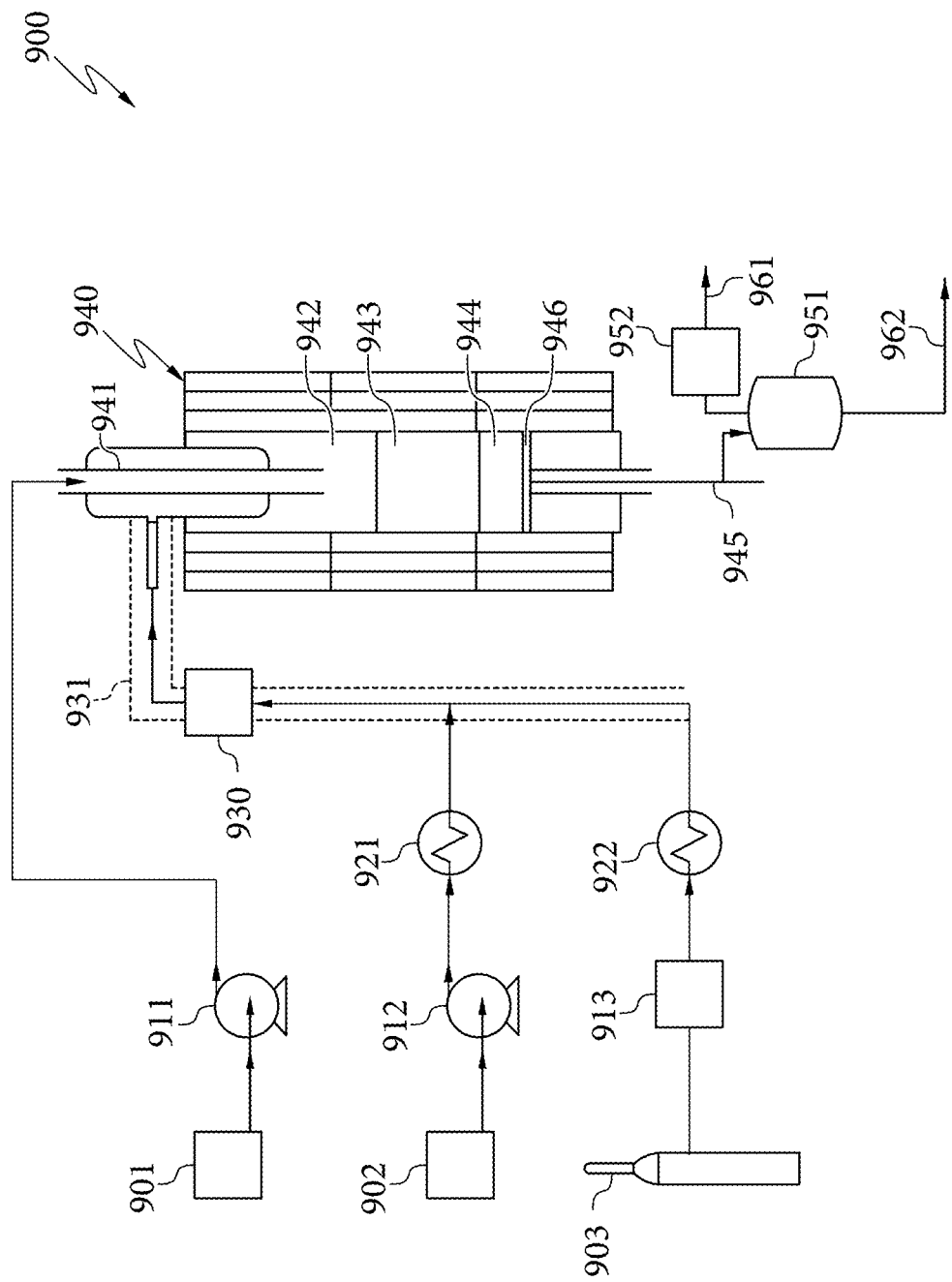
FIG. 9 schematically depicts a generalized flow diagram of a fixed bed reactor system for evaluating the cracking catalyst compositions of the examples, according to one or more embodiments shown and described in the present disclosure.

Referring now to FIG. 9, the FBR system (900) for conducting the catalyst evaluation experiments is schematically depicted. AXL crude oil (901) was fed to a fixed-bed reactor (940) using a metering pump (911). A constant feed rate of 2 g/h of the AXL crude oil (901) was used. Water (902) was fed to the fixed bed reactor (940) using a metering pump (912). Water (902) was preheated using a preheater (921). A constant feed rate of 1 g/h of water (902) was used. Nitrogen (903) was used as a carrier gas at 65 mL/min. Nitrogen (903) was fed to the fixed bed reactor (940) using a Mass Flow Controller (MFC) (913). Nitrogen (903) was preheated using a preheater (922). Water (902) and nitrogen (903) were mixed using a mixer (930) and the mixture was introduced to the fixed-bed reactor (940). Prior to entering the reactor tube, the AXL crude oil (901), water (902), and nitrogen (903) were preheated up to 250° C. in the pre-heating zone (942). The pre-heating zone (942) was pre-heated using line heaters (931). Crude oil (901) was introduced from the top of the reactor (940) through the injector (941) and mixed with steam in the top two-third of the reactor tube (940) before reaching the catalyst bed (944).

The catalyst bed (944) in the reactor tube (940) was moved a few centimeters down to allow more time for pre-heating of AXL crude oil (901) prior to contacting with the cracking catalyst in the catalyst bed (944). For each experiment, 1 gram (g) of cracking catalyst having a mesh size of 30-40 was combine with 1 g of Kaolin clay and placed at the center of the reactor tube (940), supported by quartz wool (943), (946) and a reactor insert (945). Quartz wool (943), (946) was placed both at the bottom and top of the catalyst bed (944) to keep it in position. The height of the catalyst bed (944) was 1-2 cm. The cracking catalysts of Examples 1-3 and the comparative cracking catalyst of CE. 5 and CE. 5 were each used as the cracking catalyst for a different experiment to conduct Catalyst Evaluation. Prior to conducting the steam catalytic cracking reaction, each of the cracking catalysts of Examples 1-3 and the commercial cracking catalysts of CE. 4 and CE. 5 were steam deactivated in the presence of steam at a temperature of 810° C. for 6 hours.

Following steam deactivation, the crude oil hydrocarbon feed and the water/steam were introduced to the reaction tube of the FBR. The reaction was allowed to take place for 45-60 min, until steady state was reached. The mass ratio of steam to crude oil was 0.5 grams of steam per gram of crude oil. The crude oil was cracked at a cracking temperature of 675° C. and a weight ratio of catalyst to crude oil of 1:2. The residence time of the crude oil and the steam in the fixed bed reactor (940) was 10 seconds. The total time on stream for each individual experiment of was 5 hours.

The cracking reaction product stream (945) was introduced to a gas-liquid separator (951). A Wet Test Meter (952) was placed downstream of the gas-liquid separator (951). The cracked gaseous products (961) and liquid products (962) were characterized by off-line gas chromatographic (GC) analysis using simulated distillation and naphtha analysis techniques. The reaction product streams from the cracking reaction were analyzed for yields of ethylene, propylene, and butylene. Table 6 presents the results of the AXL cracking over kaolin blended with 50% of each of catalysts CE. 4, CE. 5, Ex. 1, Ex. 2, and Ex. 3. Table 6 shows that activity and olefin selectivity over each of the cracking catalysts Examples 1-3 was higher than that over each of the commercially available catalysts CE. 4 and CE. 5. Cracking catalyst Examples 1-3 also produced less coke than the commercially available catalysts CE. 4 and CE. 5.

TABLE 6

|  | Feed (wt. %) | CE. 4 (wt. %) | Ex. 1 (wt. %) | CE. 5 (wt. %) | Ex. 2 (wt. %) | Ex. 3 (wt. %) |
| --- | --- | --- | --- | --- | --- | --- |
| Fuel Gas | 0 | 8.9 | 8.8 | 8.9 | 11.3 | 10.7 |
| Sat $C_2$—$C_4$ | 0 | 4.3 | 6 | 4.7 | 6.6 | 6.1 |
| $C_2$= | 0 | 18 | 20.4 | 14.7 | 23.6 | 22.4 |
| $C_3$= | 0 | 14.5 | 19 | 12.4 | 17.7 | 17.8 |
| $C_4$= | 0 | 6.9 | 6.7 | 8.7 | 3 | 4.5 |
| Total Light Olefins | 0 | 39.4 | 46.1 | 35.8 | 44.3 | 44.7 |
| Naphtha | 40.8 | 31.1 | 26 | 20.8 | 19.2 | 19.7 |
| Middle | 26.3 | 6.4 | 6.4 | 12.4 | 8.9 | 9.2 |
| Heavy | 32.9 | 3.6 | 2.4 | 9.8 | 3.7 | 3.9 |
| Conversion | N/A | 58.9 | 65.2 | 57 | 68.2 | 67.2 |
| Coke | N/A | 6.2 | 4.3 | 7.6 | 6 | 5.6 |

It is noted that any two quantitative values assigned to a property may constitute a range of that property, and all combinations of ranges formed from all stated quantitative values of a given property are contemplated in this disclosure.

It is noted that one or more of the following claims utilize the term "where" as a transitional phrase. For the purposes of defining the present technology, it is noted that this term is introduced in the claims as an open-ended transitional phrase that is used to introduce a recitation of a series of characteristics of the structure and should be interpreted in like manner as the more commonly used open-ended preamble term "comprising."

Having described the subject matter of the present disclosure in detail and by reference to specific aspects, it is noted that the various details of such aspects should not be taken to imply that these details are essential components of the aspects. Rather, the claims appended hereto should be taken as the sole representation of the breadth of the present disclosure and the corresponding scope of the various aspects described in this disclosure. Further, it will be apparent that modifications and variations are possible without departing from the scope of the appended claims.

What is claimed is:

1. A process for converting a hydrocarbon feed, the process comprising contacting a hydrocarbon feed with steam in the presence of a cracking catalyst under steam enhanced catalytic cracking conditions, where:
   the cracking catalyst is a nanoparticle comprising:
      a core comprising one or more ZSM-5 zeolite particles and having an outer surface; and
      a shell comprising a plurality of fibers extending radially outward from the outer surface of the core, the plurality of fibers comprising silica; and
   the contacting the hydrocarbon feed with the steam in the presence of the cracking catalyst causes at least a portion of the hydrocarbon feed to undergo steam catalytic cracking reactions to produce a cracked effluent comprising $C_2$ to $C_4$ olefins, $C_6$ to $C_{10}$ aromatic compounds, or both.

2. The process of claim 1, where the plurality of fibers further comprise alumina.

3. The process of claim 1, where the one or more ZSM-5 zeolite particles has a molar ratio of silica to alumina of from 30 to 80.

4. The process of claim 1, where the cracking catalyst has an average diameter of from 300 nanometers (nm) to 600 nm.

5. The process of claim 1, where the cracking catalyst comprises less than 0.1 wt. % of metals other than silicon and aluminum, based on the total weight of the cracking catalyst.

6. The process of claim 1, where the cracking catalyst is formed by a zeolite-seed-assisted micro-emulsion method.

7. The process of claim 1, wherein the cracking catalyst has a bimodal pore size distribution with a first peak at from 2 to 5 nm and a second peak at from 7 to 20 nm.

8. The process of claim 1, where the cracking catalyst is further defined as a nanosphere comprised of a plurality of fibers that are substantially radially oriented within the nanosphere.

9. The process of claim 1, where the contacting further comprises contacting the hydrocarbon feed with the steam in the presence of the cracking catalyst at a weighted average bed temperature (WABT) of from 100° C. to 700° C. and a steam to hydrocarbon feed mass ratio of from 0.2 to 0.8.

10. The process of claim 1, where the contacting further comprises contacting the hydrocarbon feed with the steam in the presence of the cracking catalyst in a fluidized bed reactor, a fixed bed reactor, multiple-fixed bed reactors, a batch reactor, a fluid catalytic cracking (FCC) reactor, a moving bed catalytic cracking reactor, or combinations thereof.

11. The process of claim 1, where the hydrocarbon feed is a whole crude.

12. The process of claim 1, where the hydrocarbon feed is a whole crude with an API gravity of from 25 to 52 and a sulfur content of from 0.05 to 3 wt. %.

13. The process of claim 1, wherein the contacting the hydrocarbon feed with the steam and the cracking catalyst under steam enhanced catalytic cracking conditions causes less than 6 wt. % of the hydrocarbon feed to be converted to coke, based on the total weight of the hydrocarbon feed.

14. The process of claim 1, where the contacting the hydrocarbon feed with the steam and the cracking catalyst under steam enhanced catalytic cracking conditions causes at least 60 wt. % of the hydrocarbon feed to be converted to other products.

15. The process of claim 1, where the cracked effluent comprises $C_2$ to $C_4$ olefins and the $C_2$ to $C_4$ olefins comprise ethylene, propylene, or both.

16. The process of claim 15, wherein the cracked effluent comprises at least 40 wt. % of $C_2$ to $C_4$ olefins.

17. The process of claim 1, where:
the cracking catalyst has an average diameter of from 300 nanometers (nm) to 600 nm;
the one or more ZSM-5 zeolite particles has a molar ratio of silica to alumina of from 30 to 80;
the cracking catalyst comprises less than 0.1 wt. % of metals, other than silicon and aluminum, based on the total weight of the cracking catalyst;
the cracking conditions comprise a weighted average bed temperature (WABT) of from 100° C. to 700° C. and a steam to hydrocarbon feed mass ratio of from 0.2 to 0.8;
the hydrocarbon feed comprises a whole crude with an API gravity of from 25 to 52;
the cracked effluent comprises at least 40 wt. % of $C_2$ to $C_4$ olefins; and
the $C_2$ to $C_4$ olefins comprise ethylene, propylene, or both.

18. The process of claim 1, wherein the cracking catalyst is formed by a process comprising:
preparing a silica precursor solution comprising a silica source dispersed in a mixture of a solvent and an alcohol;
combining a plurality of zeolite particles into the silica precursor solution to produce a zeolite-silica mixture;
stirring the zeolite-silica mixture;
preparing a surfactant solution comprising a hydrolyzing agent, cetyltrimethylammonium bromide (CTAB), and water;
combining the zeolite-silica mixture and the surfactant solution to form a catalyst precursor mixture;
crystallizing the catalyst precursor mixture to form a crystallized solid; and
calcining the crystallized solid to form the cracking catalyst; the cracking catalyst comprising
the core comprising the one or more ZSM-5 zeolite particles and having the outer surface, and
the shell comprising the plurality of fibers extending radially outward from the outer surface of the core.

19. The process of claim 18, where the process further comprises introducing an alumina source to the surfactant solution.

20. The process of claim 18, where the crystallizing the catalyst precursor mixture further comprises heating the catalyst precursor mixture at a temperature of from 150° C. to 200° C.

* * * * *